US012334084B2

(12) United States Patent
Liu et al.

(10) Patent No.: US 12,334,084 B2
(45) Date of Patent: Jun. 17, 2025

(54) MULTI-CHANNEL SIGNAL ENCODING METHOD AND ENCODER

(71) Applicant: Huawei Technologies Co., Ltd., Shenzhen (CN)

(72) Inventors: Zexin Liu, Shenzhen (CN); Xingtao Zhang, Shenzhen (CN); Haiting Li, Beijing (CN); Lei Miao, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/419,794

(22) Filed: Jan. 23, 2024

(65) Prior Publication Data

US 2024/0161756 A1 May 16, 2024

Related U.S. Application Data

(63) Continuation of application No. 17/408,116, filed on Aug. 20, 2021, now Pat. No. 11,935,548, which is a (Continued)

(30) Foreign Application Priority Data

Aug. 10, 2016 (CN) ........................ 201610652506.X

(51) Int. Cl.
*G10L 19/008* (2013.01)
*G10L 19/022* (2013.01)
(Continued)

(52) U.S. Cl.
CPC .......... *G10L 19/008* (2013.01); *G10L 19/022* (2013.01); *G10L 19/032* (2013.01); *G10L 25/03* (2013.01); *H04S 3/00* (2013.01)

(58) Field of Classification Search
CPC ... G10L 19/008; G10L 19/022; G10L 19/032; G10L 25/03; H04S 3/00
See application file for complete search history.

(56) References Cited

U.S. PATENT DOCUMENTS

| | | | | |
|---|---|---|---|---|
| 5,659,520 | A * | 8/1997 | Watson | G01S 15/74 342/146 |
| 6,168,568 | B1 | 1/2001 | Gavriely | |

(Continued)

FOREIGN PATENT DOCUMENTS

| | | | |
|---|---|---|---|
| AU | 2013345615 A1 | 6/2015 | |
| CA | 2775828 A1 | 4/2011 | |

(Continued)

OTHER PUBLICATIONS

Qiu, Bo, et al. "Estimation of Interchannel Time Difference in Frequency Subbands Based on Nonuniform Discrete Fourier Transform." EURASIP Journal on Audio, Speech, and Music Processing (2008): 1-7. (Year: 2008).*

(Continued)

*Primary Examiner* — Paras D Shah
*Assistant Examiner* — Oluwadamilola M Ogunbiyi
(74) *Attorney, Agent, or Firm* — Conley Rose, P.C.

(57) ABSTRACT

A multi-channel signal encoding method includes obtaining a multi-channel signal of a current frame; determining an initial multi-channel parameter of the current frame; determining a difference parameter based on the initial multi-channel parameter of the current frame and multi-channel parameters of previous K frames of the current frame, where the difference parameter represents a difference between the initial multi-channel parameter of the current frame and the multi-channel parameters of the previous K frames, and K is an integer greater than or equal to one; determining a multi-channel parameter of the current frame based on the difference parameter and a characteristic parameter of the current frame; and encoding the multi-channel signal based on the multi-channel parameter of the current frame.

21 Claims, 6 Drawing Sheets

Related U.S. Application Data continuation of application No. 16/272,397, filed on Feb. 11, 2019, now Pat. No. 11,133,014, which is a continuation of application No. PCT/CN2017/074419, filed on Feb. 22, 2017.

(51) Int. Cl.

| | |
|---|---|
| ***G10L 19/032*** | (2013.01) |
| ***G10L 25/03*** | (2013.01) |
| ***H04S 3/00*** | (2006.01) |

(56) References Cited

U.S. PATENT DOCUMENTS

| | | | | |
|---|---|---|---|---|
| 8,626,518 | B2 | 1/2014 | Lang et al. | |
| 9,514,757 | B2 | 12/2016 | Oshikiri et al. | |
| 2004/0260542 | A1 | 12/2004 | Ananthapadmanabhan et al. | |
| 2005/0226426 | A1 | 10/2005 | Oomen et al. | |
| 2006/0004583 | A1 | 1/2006 | Herre et al. | |
| 2006/0133618 | A1 | 6/2006 | Mllemoes et al. | |
| 2006/0206323 | A1 | 9/2006 | Breebaart | |
| 2007/0140499 | A1 | 6/2007 | Davis | |
| 2007/0165709 | A1 | 7/2007 | Walker et al. | |
| 2009/0110201 | A1 | 4/2009 | Kim et al. | |
| 2009/0119111 | A1 | 5/2009 | Goto et al. | |
| 2009/0164224 | A1 | 6/2009 | Fejzo | |
| 2009/0265170 | A1 | 10/2009 | Irie et al. | |
| 2010/0085102 | A1 | 4/2010 | Lee et al. | |
| 2010/0241436 | A1 | 9/2010 | Kim et al. | |
| 2011/0063453 | A1 | 3/2011 | Han et al. | |
| 2011/0173009 | A1 | 7/2011 | Fuchs et al. | |
| 2011/0257968 | A1 | 10/2011 | Kim et al. | |
| 2012/0069921 | A1 | 3/2012 | Kim et al. | |
| 2012/0239408 | A1 | 9/2012 | Oh et al. | |
| 2012/0243690 | A1 | 9/2012 | Engdegard et al. | |
| 2012/0265543 | A1 | 10/2012 | Lang et al. | |
| 2012/0289178 | A1 * | 11/2012 | Matsumura | H04W 52/0206 455/403 |
| 2013/0022206 | A1 * | 1/2013 | Thiergart | G10L 19/0204 381/17 |
| 2013/0117029 | A1 | 5/2013 | Liu et al. | |
| 2013/0236022 | A1 | 9/2013 | Virette et al. | |
| 2013/0282384 | A1 * | 10/2013 | Gibbs | G10L 19/008 704/500 |
| 2014/0088978 | A1 | 3/2014 | Mundt et al. | |
| 2014/0098963 | A1 * | 4/2014 | Lang | G10L 19/008 381/23 |
| 2014/0086416 | A1 | 5/2014 | Sen | |
| 2014/0188465 | A1 | 7/2014 | Choo et al. | |
| 2014/0355768 | A1 | 12/2014 | Sen et al. | |
| 2015/0049872 | A1 * | 2/2015 | Virette | G10L 19/008 381/23 |
| 2015/0154970 | A1 | 6/2015 | Purnhagen et al. | |
| 2015/0213790 | A1 | 7/2015 | Oh | |
| 2015/0289065 | A1 * | 10/2015 | Jensen | H04R 25/552 381/315 |
| 2015/0310871 | A1 | 10/2015 | Vasilache et al. | |
| 2016/0005407 | A1 | 1/2016 | Friedrich et al. | |
| 2016/0078877 | A1 | 3/2016 | Vasilache et al. | |
| 2016/0111100 | A1 | 4/2016 | Ramo et al. | |
| 2016/0133262 | A1 | 5/2016 | Fueg et al. | |
| 2016/0148618 | A1 | 5/2016 | Huang et al. | |
| 2016/0198279 | A1 | 7/2016 | Briand et al. | |
| 2016/0210978 | A1 | 7/2016 | Chebiyyam et al. | |
| 2016/0247508 | A1 | 8/2016 | Dick et al. | |
| 2016/0254002 | A1 | 9/2016 | Zhang et al. | |
| 2017/0169833 | A1 * | 6/2017 | Lecomte | G10L 19/20 |
| 2017/0208415 | A1 * | 7/2017 | Ojala | H04S 7/00 |
| 2017/0236521 | A1 | 8/2017 | Chebiyyam et al. | |
| 2017/0365263 | A1 | 12/2017 | Disch et al. | |
| 2018/0261233 | A1 | 9/2018 | Ehara et al. | |
| 2019/0172474 | A1 | 6/2019 | Liu et al. | |

FOREIGN PATENT DOCUMENTS

| | | | | | |
|---|---|---|---|---|---|
| CN | 1954642 | A | | 4/2007 | |
| CN | 101188878 | A | | 5/2008 | |
| CN | 102089812 | A | | 6/2011 | |
| CN | 102157151 | A | | 8/2011 | |
| CN | 101582262 | B | | 12/2011 | |
| CN | 102307323 | A | | 1/2012 | |
| CN | 104246873 | A | | 12/2014 | |
| CN | 104641414 | A | | 5/2015 | |
| CN | 102968993 | B | * | 8/2016 | G10L 19/008 |
| EP | 2752845 | A2 | | 7/2014 | |
| EP | 2702776 | B1 | | 9/2015 | |
| EP | 3035330 | A1 | | 6/2016 | |
| EP | 3582218 | A1 | | 12/2019 | |
| JP | 2008519301 | A | | 6/2008 | |
| JP | 2013524267 | A | | 6/2013 | |
| JP | 2014529101 | A | | 10/2014 | |
| JP | 2015514234 | A | | 5/2015 | |
| KR | 20060049980 | A | * | 7/2005 | G10L 19/02 |
| KR | 102205596 | B1 | | 1/2021 | |
| RU | 2393550 | C2 | | 6/2010 | |
| RU | 2473062 | C2 | | 1/2013 | |
| WO | 2017125563 | A1 | | 7/2017 | |

OTHER PUBLICATIONS

Ojala, Pasi, Mikko Tammi, and Miikka Vilermo. "Parametric binaural audio coding." 2010 IEEE International Conference on Acoustics, Speech and Signal Processing. IEEE, 2010. (Year: 2010).*

Nikunen, Joonas. "Object-based Modeling of Audio for Coding and Source Separation." (2015). (Year: 2015).*

Hoang, Thi Minh Nguyet, et al. "Parametric stereo extension of ITU-T G. 722 based on a new downmixing scheme." 2010 IEEE International Workshop on Multimedia Signal Processing. IEEE, 2010. (Year: 2010).*

Lang, Yue, David Virette, and Christof Faller. "Novel low complexity coherence estimation and synthesis algorithms for parametric stereo coding." 2012 Proceedings of the 20th European Signal Processing Conference (EUSIPCO). IEEE, 2012. (Year: 2012).*

Thompson, Jeffrey, et al. "Direct-diffuse decomposition of multichannel signals using a system of pairwise correlations." Audio Engineering Society Convention 133. Audio Engineering Society, 2012. (Year: 2012).*

ISO/IEC 14496-3:2009€,"Subpart 8: Technical description of parametric coding for high quality audio" May 15, 2009, 28 pages.

Yang, C., et al. "Multi-Channel Object-Based Spatial Parameter Compression Approach for 3D Audio," Springer International Publishing Switzerland, PCM 2015, pp. 354-364.

"ISO/IEC 14496-3:200x, Fourth Edition, Part 8," Shenzhen;(Motion Picture Expert Group or ISO/IEC JTC1/SC29/WG11), May 15, 2009, XP30017011, 115 pages.

Zhou, C., et al., "A Higher-order Prediction Method of Spatial Cues Based on Bayesian Gradient Model," XP31727394, Jun. 25, 2010, pp. 85-89.

Gao, L., et al., "JND-based spatial parameter quantization of multichannel audio signals," EURASIP Journal on Audio, Speech and Music Processing, 2016, 18 pages.

* cited by examiner

MULTI-CHANNEL SIGNAL ENCODING METHOD AND ENCODER

CROSS-REFERENCE TO RELATED APPLICATIONS

This application is a continuation of U.S. patent application Ser. No. 17/408,116, filed on Aug. 20, 2021, which is a continuation of U.S. patent application Ser. No. 16/272,397, filed on Feb. 11, 2019, now U.S. Pat. No. 11,133,014, which is a continuation of International Patent Application No. PCT/CN2017/074419, filed on Feb. 22, 2017, which claims priority to Chinese Patent Application No. 201610652506.X, filed on Aug. 10, 2016. All of the aforementioned patent applications are hereby incorporated by reference in their entireties.

TECHNICAL FIELD

This application relates to the audio signal encoding field, and in particular, to a multi-channel signal encoding method and an encoder.

BACKGROUND

Improvement in quality of life is accompanied with people's ever-increasing requirements for high-quality audio. Compared with a mono signal, stereo has a sense of direction and a sense of distribution of acoustic sources, and can improve clarity, intelligibility, and a sense of immediacy of sound, and therefore is popular with people.

Stereo processing technologies mainly include mid/side (MS) encoding, intensity stereo (IS) encoding, and parametric stereo (PS) encoding.

In the MS encoding, MS transformation is performed on two signals based on inter-channel coherence (IC), and energy of channels is mainly concentrated in a mid-channel such that inter-channel redundancy is eliminated. In the MS encoding technology, reduction of a code rate depends on coherence between input signals. When coherence between a left-channel signal and a right-channel signal is poor, the left-channel signal and the right-channel signal need to be transmitted separately.

In the IS encoding, high-frequency components of a left-channel signal and a right-channel signal are simplified based on a feature that a human auditory system is insensitive to a phase difference between high-frequency components (for example, components above 2 kilohertz (kHz)) of channels. However, the IS encoding technology is effective only for high-frequency components. If the IS encoding technology is extended to a low frequency, severe man-made noise is caused.

The PS encoding is an encoding scheme based on a binaural auditory model. As shown in FIG. 1 (in FIG. 1, $x_L$ is a left-channel time-domain signal, and $x_R$ is a right-channel time-domain signal), in a PS encoding process, an encoder side converts a stereo signal into a mono signal and a few spatial parameters (or spatial perception parameters) that describe a spatial sound field. As shown in FIG. 2, after obtaining a mono signal and spatial parameters, a decoder side restores a stereo signal with reference to the spatial parameters. Compared with the MS encoding, the PS encoding has a higher compression ratio. Therefore, in the PS encoding, a higher encoding gain can be obtained on a premise that relatively good sound quality is maintained. In addition, the PS encoding can be performed in full audio bandwidth, and can well restore a spatial perception effect of stereo.

In the PS encoding, multi-channel parameters (also referred to as spatial parameters) include IC, an inter-channel level difference (ILD), an inter-channel time difference (ITD), an overall phase difference (OPD), an inter-channel phase difference (IPD), and the like. The IC describes inter-channel cross-correlation or coherence. This parameter determines perception of a sound field range, and can improve a sense of space and sound stability of an audio signal. The ILD is used to distinguish a horizontal azimuth of a stereo acoustic source, and describes an inter-channel energy difference. This parameter affects frequency components of an entire spectrum. The ITD and the IPD are spatial parameters that represent a horizontal orientation of an acoustic source, and describe inter-channel time and phase differences. The ILD, the ITD, and the IPD can determine perception of human ears for a location of an acoustic source, can be used to effectively determine a sound field location, and plays an important part in restoration of a stereo signal.

In a stereo recording process, due to impact of factors such as background noise, reverberation, and multi-party speaking, a multi-channel parameter calculated according to an existing PS encoding scheme is always unstable (a multi-channel parameter value frequently and sharply changes). A downmixed signal calculated based on such a multi-channel parameter is discontinuous. As a result, quality of stereo obtained on the decoder side is poor. For example, an acoustic image of the stereo played on the decoder side jitters frequently, and even auditory freezing occurs.

SUMMARY

This application provides a multi-channel signal encoding method and an encoder to improve stability of a multi-channel parameter in PS encoding, thereby improving encoding quality of an audio signal.

According to a first aspect, a multi-channel signal encoding method is provided, including obtaining a multi-channel signal of a current frame, determining an initial multi-channel parameter of the current frame, determining a difference parameter based on the initial multi-channel parameter of the current frame and multi-channel parameters of previous K frames of the current frame, where the difference parameter is used to represent a difference between the initial multi-channel parameter of the current frame and the multi-channel parameters of the previous K frames, and K is an integer greater than or equal to 1, determining a multi-channel parameter of the current frame based on the difference parameter and a characteristic parameter of the current frame, and encoding the multi-channel signal based on the multi-channel parameter of the current frame.

The multi-channel parameter of the current frame is determined based on comprehensive consideration of the characteristic parameter of the current frame and the difference between the current frame and the previous K frames. This determining manner is more proper. Compared with a manner of directly reusing a multi-channel parameter of a previous frame for the current frame, this manner can better ensure accuracy of inter-channel information of a multi-channel signal.

With reference to the first aspect, in some implementations of the first aspect, determining a multi-channel parameter of the current frame based on the difference parameter and a characteristic parameter of the current frame includes, if the difference parameter meets a first preset condition, determining the multi-channel parameter of the current frame based on the characteristic parameter of the current frame.

With reference to the first aspect, in some implementations of the first aspect, the difference parameter is an absolute value of a difference between the initial multi-channel parameter of the current frame and a multi-channel parameter of a previous frame of the current frame, and the first preset condition is that the difference parameter is greater than a preset first threshold.

With reference to the first aspect, in some implementations of the first aspect, the difference parameter is a product of the initial multi-channel parameter of the current frame and a multi-channel parameter of a previous frame of the current frame, and the first preset condition is that the difference parameter is less than or equal to 0.

With reference to the first aspect, in some implementations of the first aspect, determining the multi-channel parameter of the current frame based on the characteristic parameter of the current frame includes determining the multi-channel parameter of the current frame based on a correlation parameter of the current frame, where the correlation parameter is used to represent a degree of correlation between the current frame and the previous frame of the current frame.

With reference to the first aspect, in some implementations of the first aspect, the method further includes determining the correlation parameter based on a target channel signal in the multi-channel signal of the current frame and a target channel signal in a multi-channel signal of the previous frame.

With reference to the first aspect, in some implementations of the first aspect, determining the correlation parameter based on a target channel signal in the multi-channel signal of the current frame and a target channel signal in a multi-channel signal of the previous frame includes determining the correlation parameter based on a frequency domain parameter of the target channel signal in the multi-channel signal of the current frame and a frequency domain parameter of the target channel signal in the multi-channel signal of the previous frame, where the frequency domain parameter is at least one of a frequency domain amplitude value and a frequency domain coefficient of the target channel signal.

With reference to the first aspect, in some implementations of the first aspect, the method further includes determining the correlation parameter based on a pitch period of the current frame and a pitch period of the previous frame.

With reference to the first aspect, in some implementations of the first aspect, determining the multi-channel parameter of the current frame based on the characteristic parameter of the current frame includes, if the characteristic parameter meets a second preset condition, determining the multi-channel parameter of the current frame based on multi-channel parameters of previous T frames of the current frame, where T is an integer greater than or equal to 1.

With reference to the first aspect, in some implementations of the first aspect, determining the multi-channel parameter of the current frame based on multi-channel parameters of previous T frames of the current frame includes determining the multi-channel parameters of the previous T frames as the multi-channel parameter of the current frame, where T is equal to 1.

With reference to the first aspect, in some implementations of the first aspect, determining the multi-channel parameter of the current frame based on multi-channel parameters of previous T frames of the current frame includes determining the multi-channel parameter of the current frame based on a change trend of the multi-channel parameters of the previous T frames, where T is greater than or equal to 2.

With reference to the first aspect, in some implementations of the first aspect, the characteristic parameter includes at least one of the correlation parameter and a peak-to-average ratio parameter of the current frame, where the correlation parameter is used to represent the degree of correlation between the current frame and the previous frame of the current frame, and the peak-to-average ratio parameter is used to represent a peak-to-average ratio of a signal of at least one channel in the multi-channel signal of the current frame, and the second preset condition is that the characteristic parameter is greater than a preset threshold.

With reference to the first aspect, in some implementations of the first aspect, the initial multi-channel parameter of the current frame includes at least one of an initial IC value of the current frame, an initial ITD value of the current frame, an initial IPD value of the current frame, an initial OPD value of the current frame, and an initial ILD value of the current frame.

With reference to the first aspect, in some implementations of the first aspect, the characteristic parameter of the current frame includes at least one of the following parameters of the current frame, the correlation parameter, the peak-to-average ratio parameter, a signal-to-noise ratio parameter, and a spectrum tilt parameter, where the correlation parameter is used to represent the degree of correlation between the current frame and the previous frame, the peak-to-average ratio parameter is used to represent the peak-to-average ratio of the signal of the at least one channel in the multi-channel signal of the current frame, the signal-to-noise ratio parameter is used to represent a signal-to-noise ratio of a signal of at least one channel in the multi-channel signal of the current frame, and the spectrum tilt parameter is used to represent a spectrum tilt degree of a signal of at least one channel in the multi-channel signal of the current frame.

According to a second aspect, an encoder is provided, including an obtaining unit configured to obtain a multi-channel signal of a current frame, a first determining unit configured to determine an initial multi-channel parameter of the current frame, a second determining unit configured to determine a difference parameter based on the initial multi-channel parameter of the current frame and multi-channel parameters of previous K frames of the current frame, where the difference parameter is used to represent a difference between the initial multi-channel parameter of the current frame and the multi-channel parameters of the previous K frames, and K is an integer greater than or equal to 1, a third determining unit configured to determine a multi-channel parameter of the current frame based on the difference parameter and a characteristic parameter of the current frame, and an encoding unit configured to encode the multi-channel signal based on the multi-channel parameter of the current frame.

The multi-channel parameter of the current frame is determined based on comprehensive consideration of the characteristic parameter of the current frame and the difference between the current frame and the previous K frames. This determining manner is more proper. Compared with a manner of directly reusing a multi-channel parameter of a previous frame for the current frame, this manner can better ensure accuracy of inter-channel information of a multi-channel signal.

With reference to the second aspect, in some implementations of the second aspect, the third determining unit is further configured to, if the difference parameter meets a first preset condition, determine the multi-channel parameter of the current frame based on the characteristic parameter of the current frame.

With reference to the second aspect, in some implementations of the second aspect, the difference parameter is an absolute value of a difference between the initial multi-channel parameter of the current frame and a multi-channel parameter of a previous frame of the current frame, and the first preset condition is that the difference parameter is greater than a preset first threshold.

With reference to the second aspect, in some implementations of the second aspect, the difference parameter is a product of the initial multi-channel parameter of the current frame and a multi-channel parameter of a previous frame of the current frame, and the first preset condition is that the difference parameter is less than or equal to 0.

With reference to the second aspect, in some implementations of the second aspect, the third determining unit is further configured to determine the multi-channel parameter of the current frame based on a correlation parameter of the current frame, where the correlation parameter is used to represent a degree of correlation between the current frame and the previous frame of the current frame.

With reference to the second aspect, in some implementations of the second aspect, the encoder further includes a fourth determining unit configured to determine the correlation parameter based on a target channel signal in the multi-channel signal of the current frame and a target channel signal in a multi-channel signal of the previous frame.

With reference to the second aspect, in some implementations of the second aspect, the fourth determining unit is further configured to determine the correlation parameter based on a frequency domain parameter of the target channel signal in the multi-channel signal of the current frame and a frequency domain parameter of the target channel signal in the multi-channel signal of the previous frame, where the frequency domain parameter is at least one of a frequency domain amplitude value and a frequency domain coefficient of the target channel signal.

With reference to the second aspect, in some implementations of the second aspect, the encoder further includes a fifth determining unit configured to determine the correlation parameter based on a pitch period of the current frame and a pitch period of the previous frame.

With reference to the second aspect, in some implementations of the second aspect, the third determining unit is further configured to, if the characteristic parameter meets a second preset condition, determine the multi-channel parameter of the current frame based on multi-channel parameters of previous T frames of the current frame, where T is an integer greater than or equal to 1.

With reference to the second aspect, in some implementations of the second aspect, the third determining unit is further configured to determine the multi-channel parameters of the previous T frames as the multi-channel parameter of the current frame, where T is equal to 1.

With reference to the second aspect, in some implementations of the second aspect, the third determining unit is further configured to determine the multi-channel parameter of the current frame based on a change trend of the multi-channel parameters of the previous T frames, where T is greater than or equal to 2.

With reference to the second aspect, in some implementations of the second aspect, the characteristic parameter includes at least one of the correlation parameter and a peak-to-average ratio parameter of the current frame, where the correlation parameter is used to represent the degree of correlation between the current frame and the previous frame of the current frame, and the peak-to-average ratio parameter is used to represent a peak-to-average ratio of a signal of at least one channel in the multi-channel signal of the current frame, and the second preset condition is that the characteristic parameter is greater than a preset threshold.

With reference to the second aspect, in some implementations of the second aspect, the initial multi-channel parameter of the current frame includes at least one of an initial IC value of the current frame, an initial ITD value of the current frame, an initial IPD value of the current frame, an initial OPD value of the current frame, and an initial ILD value of the current frame.

With reference to the second aspect, in some implementations of the second aspect, the characteristic parameter of the current frame includes at least one of the following parameters of the current frame, the correlation parameter, the peak-to-average ratio parameter, a signal-to-noise ratio parameter, and a spectrum tilt parameter, where the correlation parameter is used to represent the degree of correlation between the current frame and the previous frame, the peak-to-average ratio parameter is used to represent the peak-to-average ratio of the signal of the at least one channel in the multi-channel signal of the current frame, the signal-to-noise ratio parameter is used to represent a signal-to-noise ratio of a signal of at least one channel in the multi-channel signal of the current frame, and the spectrum tilt parameter is used to represent a spectrum tilt degree of a signal of at least one channel in the multi-channel signal of the current frame.

According to a third aspect, an encoder is provided, including a memory and a processor. The memory is configured to store a program, and the processor is configured to execute the program. When the program is executed, the processor performs the method in the first aspect.

According to a fourth aspect, a computer-readable medium is provided. The computer-readable medium stores program code to be executed by an encoder. The program code includes an instruction used to perform the method in the first aspect.

In this application, the multi-channel parameter of the current frame is determined based on comprehensive consideration of the characteristic parameter of the current frame and the difference between the current frame and the previous K frames. This determining manner is more proper. Compared with a manner of directly reusing the multi-channel parameter of the previous frame for the current frame, this manner can better ensure accuracy of inter-channel information of a multi-channel signal.

DESCRIPTION OF EMBODIMENTS

Figure 1:
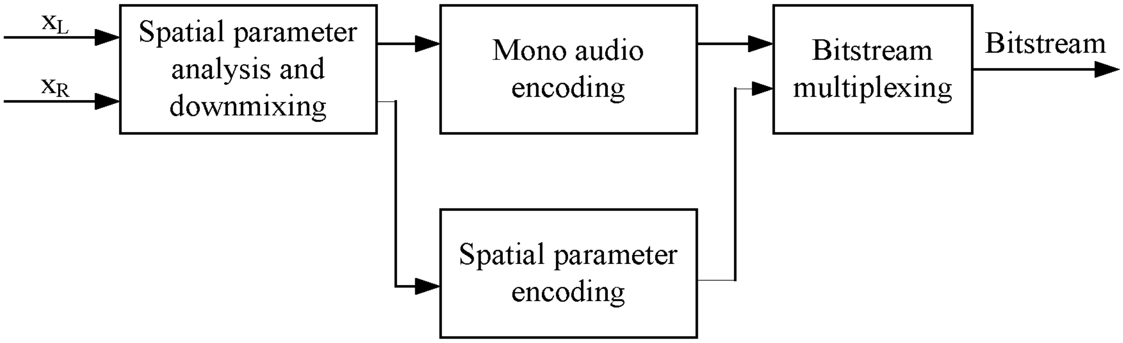
FIG. 1 is a flowchart of PS encoding.
Figure 2:
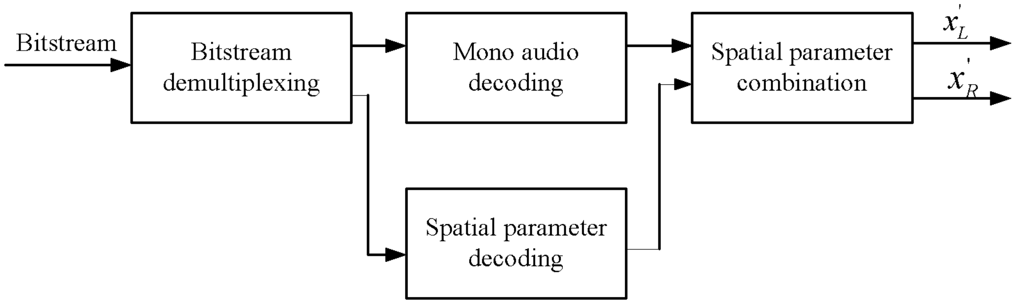
FIG. 2 is a flowchart of PS decoding.

It should be noted that a stereo signal may also be referred to as a multi-channel signal. The foregoing briefly describes functions and meanings of multi-channel parameters of the multi-channel signal, an ILD, an ITD, and an IPD. For ease of understanding, the following describes the ILD, the ITD, and the IPD in a more detailed manner using an example in which a signal picked up by a first microphone is a first-channel signal and a signal picked up by a second microphone is a second-channel signal.

The ILD describes an energy difference between the first-channel signal and the second-channel signal. Usually, a ratio of energy of a left channel to energy of a right channel is calculated, and then the ratio is converted into a logarithm-domain value. For example, if an ILD value is greater than 0, it indicates that energy of the first-channel signal is higher than energy of the second-channel signal, if an ILD value is equal to 0, it indicates that energy of the first-channel signal is equal to energy of the second-channel signal, or if an ILD value is less than 0, it indicates that energy of the first-channel signal is less than energy of the second-channel signal. For another example, if the ILD is less than 0, it indicates that energy of the first-channel signal is higher than energy of the second-channel signal, if the ILD is equal to 0, it indicates that energy of the first-channel signal is equal to energy of the second-channel signal, or if the ILD is greater than 0, it indicates that energy of the first-channel signal is less than energy of the second-channel signal. It should be understood that the foregoing values are merely examples, and a relationship between the ILD value and the energy difference between the first-channel signal and the second-channel signal may be defined based on experience or an actual requirement.

The ITD describes a time difference between the first-channel signal and the second-channel signal, namely, a difference between a time at which sound generated by an acoustic source arrives at the first microphone and a time at which the sound generated by the acoustic source arrives at the second microphone. For example, if an ITD value is greater than 0, it indicates that the time at which the sound generated by the acoustic source arrives at the first microphone is earlier than the time at which the sound generated by the acoustic source arrives at the second microphone, if an ITD value is equal to 0, it indicates that the sound generated by the acoustic source simultaneously arrives at the first microphone and the second microphone, or if an ITD value is less than 0, it indicates that the time at which the sound generated by the acoustic source arrives at the first microphone is later than the time at which the sound generated by the acoustic source arrives at the second microphone. For another example, if the ITD is less than 0, it indicates that the time at which the sound generated by the acoustic source arrives at the first microphone is earlier than the time at which the sound generated by the acoustic source arrives at the second microphone, if the ITD is equal to 0, it indicates that the sound generated by the acoustic source simultaneously arrives at the first microphone and the second microphone, or if the ITD is greater than 0, it indicates that the time at which the sound generated by the acoustic source arrives at the first microphone is later than the time at which the sound generated by the acoustic source arrives at the second microphone. It should be understood that the foregoing values are merely examples, and a relationship between the ITD value and the time difference between the first-channel signal and the second-channel signal may be defined based on experience or an actual requirement.

The IPD describes a phase difference between the first-channel signal and the second-channel signal. This parameter is usually used together with the ITD to restore phase information of a multi-channel signal on a decoder side.

It can be learned from the foregoing descriptions that an existing multi-channel parameter calculation manner causes discontinuity of a multi-channel parameter. For ease of understanding, with reference to FIG. 3 and FIG. 4, the following describes in detail the existing multi-channel parameter calculation manner and disadvantages of the existing multi-channel parameter calculation manner using an example in which a multi-channel signal includes a left-channel signal and a right-channel signal, and a multi-channel parameter is an ITD value.

In an embodiment, an ITD value may be calculated in a plurality of manners. For example, the ITD value may be calculated in time domain, or the ITD value may be calculated in frequency domain.

Figure 3:
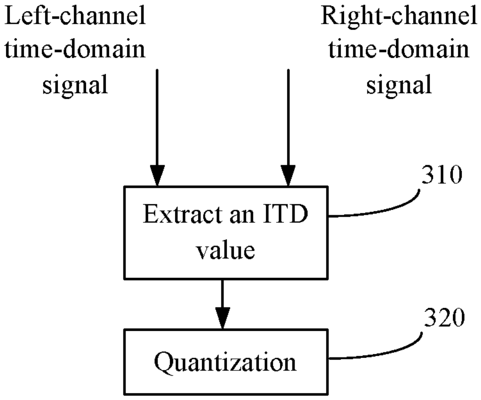
FIG. 3 is a schematic flowchart of a time-domain-based ITD parameter extraction method.

FIG. 3 is a schematic flowchart of a time-domain-based ITD value calculation method. The method in FIG. 3 includes the following steps.

Step 310: Calculate an ITD value based on a left-channel time-domain signal and a right-channel time-domain signal.

Further, the ITD parameter may be calculated based on the left-channel time-domain signal and the right-channel time-domain signal using a time-domain cross-correlation function. For example, calculation is performed within a range: 0≤i≤Tmax:

$$c_n(i)=\Sigma_{j=0}^{Length-1-i}x_R(j)\cdot x_L(j+i), \text{ and}$$

$$c_p(i)=\Sigma_{j=0}^{Length-1-i}x_L(j)\cdot x_R(j+i).$$

If $$\max_{0\le i\le Tmax}(c_n(i)) > \max_{0\le i\le Tmax}(c_p(i)),$$

$T_1$ is an opposite number of an index value corresponding to $\max(C_n(i))$, otherwise, $T_1$ is an index value corresponding to $\max(C_p(i))$, where i is an index value of the cross-correlation function, $x_R$ is the right-channel time-domain signal, $x_L$ is the left-channel time-domain signal, $T_{max}$ corresponds to a maximum ITD value at different sampling rates, and Length is a frame length.

Step 320: Perform quantization processing on the ITD value.

Figure 4:
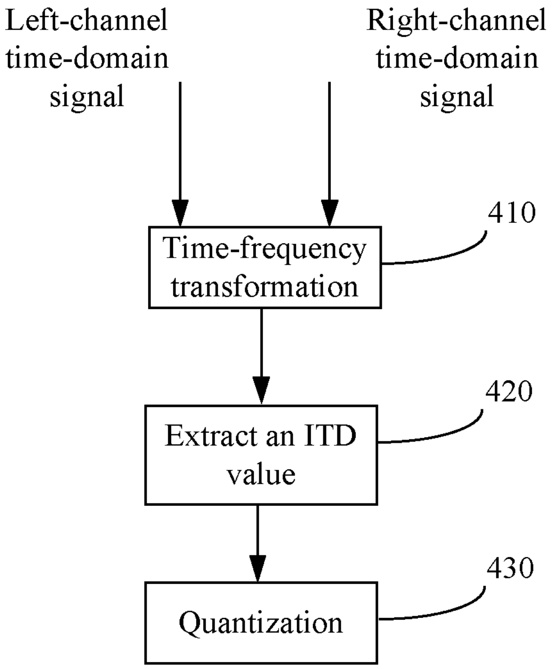
FIG. 4 is a schematic flowchart of a frequency-domain-based ITD parameter extraction method.

FIG. 4 is a schematic flowchart of a frequency-domain-based ITD value calculation method. The method in FIG. 4 includes the following steps.

Step 410: Perform time-frequency transformation on a left-channel time-domain signal and a right-channel time-domain signal to obtain a left-channel frequency-domain signal and a right-channel frequency-domain signal.

Further, in the time-frequency transformation, a time-domain signal may be transformed into a frequency-domain signal using a technology such as discrete Fourier transform (DFT) or modified discrete cosine transform (MDCT).

For example, time-frequency transformation may be performed on the input left-channel time-domain signal and right-channel time-domain signal using DFT transformation. Further, the DFT transformation may be performed using the following formula:

$$X(k)=\sum_{n=0}^{Length-1} x(n)\cdot e^{-j\frac{2\pi\cdot n\cdot k}{L}},\ 0\le k<L,$$

where n is an index value of a sample of a time-domain signal, k is an index value of a frequency bin of a frequency-domain signal, L is a time-frequency transformation length, and x(n) is the left-channel time-domain signal or the right-channel time-domain signal.

Step 420: Calculate an ITD value based on the left-channel frequency-domain signal and the right-channel frequency-domain signal.

Further, L frequency bins of a frequency-domain signal may be divided into a plurality of sub-bands. An index value of a frequency bin included in a $b^{th}$ sub-band is $A_{b-1}\le k\le A_b-1$. Within a search range $-T_{max}\le j\le T_{max}$, an amplitude value may be calculated using the following formula:

$$mag(j)=\sum_{k=A_{b-1}}^{A_b-1} X_L(k)*X_R(k)*\exp\left(\frac{2\pi*k*j}{L}\right).$$

In this case, an ITD value of the $b^{th}$ sub-band may be $T(k)=\arg\max_{-T_{max}\le j\le T_{max}}(mag\ (j))$, that is, an index value of a sample corresponding to a maximum value calculated based on the foregoing formula.

Step 430: Perform quantization processing on the ITD value.

In the other approaches, if a peak value of a cross correlation coefficient of a multi-channel signal of a current frame is relatively small, a calculated ITD value may be considered inaccurate. In this case, the ITD value of the current frame is zeroed. Due to impact of factors such as background noise, reverberation, and multi-party speaking, an ITD value calculated according to an existing PS encoding scheme is frequently zeroed. As a result, the ITD value frequently and sharply changes, and inter-frame discontinuity is caused for a downmixed signal calculated based on such an ITD value, and consequently acoustic quality of a multi-channel signal is poor.

To resolve the problem that a multi-channel parameter frequently and sharply changes, a feasible processing manner is as follows. When a calculated multi-channel parameter of a current frame is considered inaccurate, a multi-channel parameter of a previous frame of the current frame may be reused. In this processing manner, the problem that a multi-channel parameter frequently and sharply changes can be well resolved. However, this processing manner may cause the following problem. If signal quality of the current frame is relatively good, the calculated multi-channel parameter of the current frame is usually relatively accurate. In this case, if the processing manner is still used, the multi-channel parameter of the previous frame may still be reused as a multi-channel parameter of the current frame, and the relatively accurate multi-channel parameter of the current frame is discarded. As a result, inter-channel information of a multi-channel signal is inaccurate.

Figure 5:
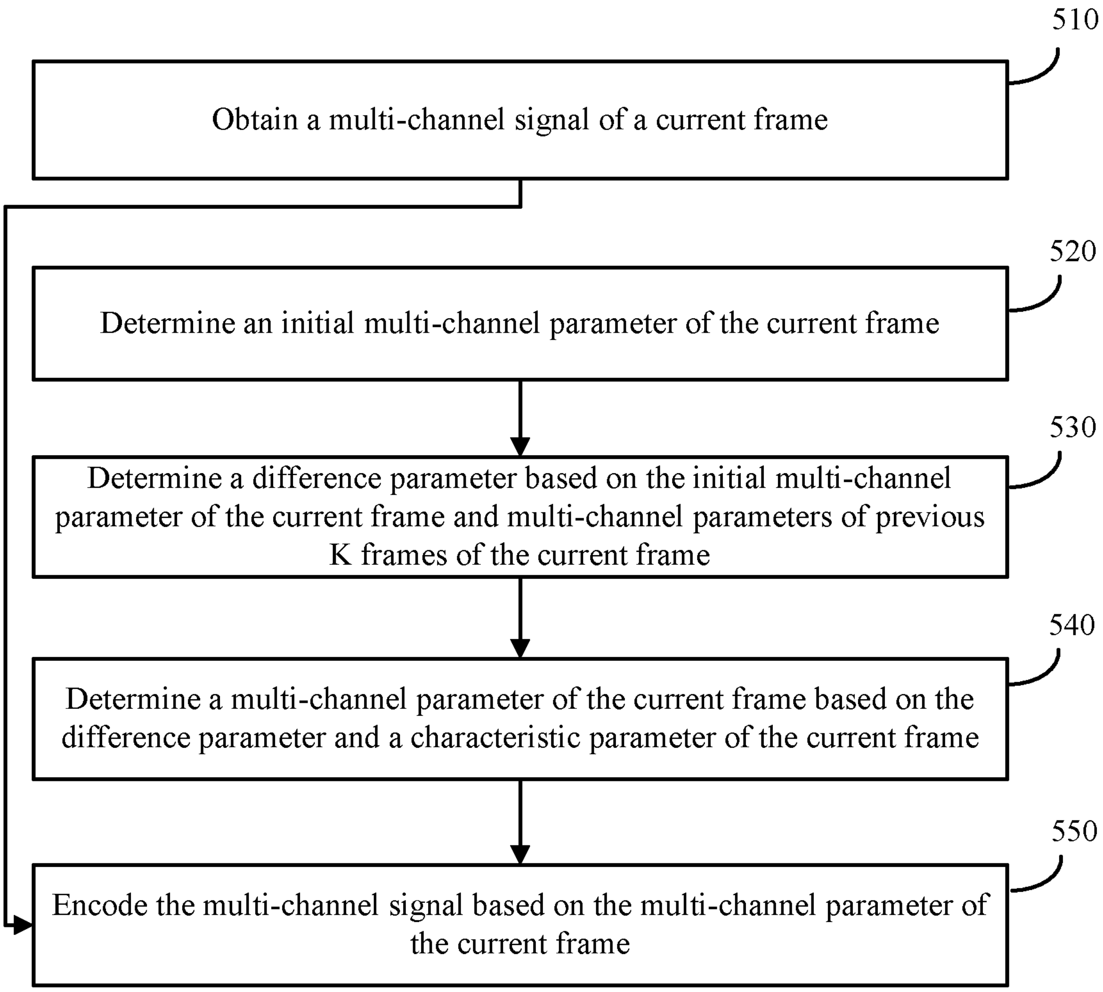
FIG. 5 is a schematic flowchart of a multi-channel signal encoding method according to an embodiment of this application.
Figure 6:
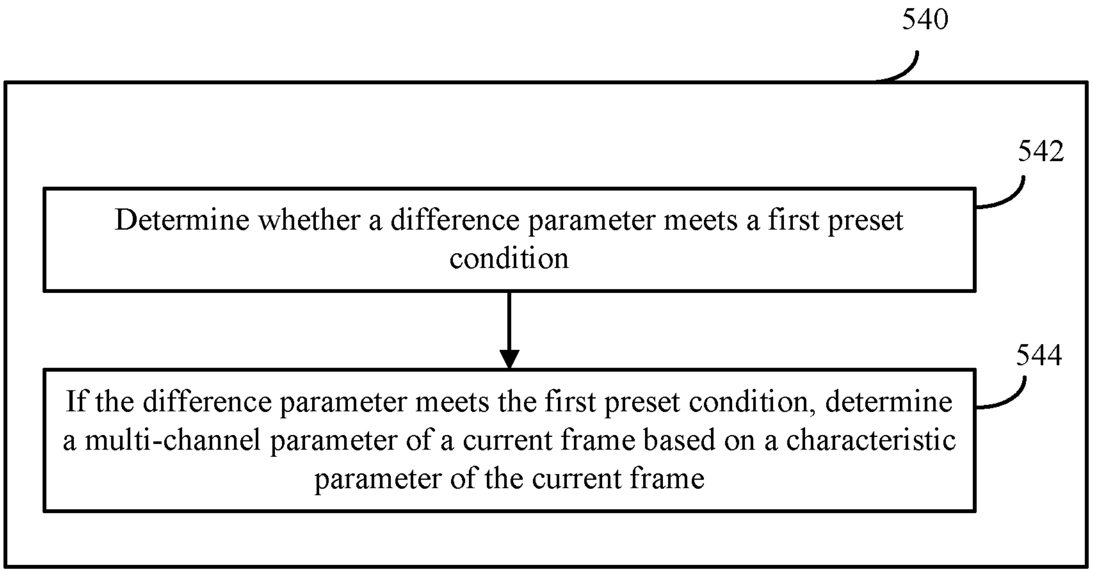
FIG. 6 is a detailed flowchart of step 540 in FIG. 5.

With reference to FIG. 5 and FIG. 6, the following describes in detail an audio signal encoding method according to the embodiments of this application.

FIG. 5 is a schematic flowchart of a multi-channel signal encoding method according to an embodiment of this application. The method in FIG. 5 includes the following steps.

Step 510. Obtain a multi-channel signal of a current frame.

It should be noted that a quantity of multi-channel signals is not limited in this embodiment of this application. Further, the multi-channel signal may be a dual-channel signal, a three-channel signal, or a signal of more than three channels. For example, the multi-channel signal may include a left-channel signal and a right-channel signal. For another example, the multi-channel signal may include a left-channel signal, a middle-channel signal, a right-channel signal, and a rear-channel signal.

Step 520. Determine an initial multi-channel parameter of the current frame.

In some embodiments, the initial multi-channel parameter of the current frame may be used to represent correlation between multi-channel signals.

In some embodiments, the initial multi-channel parameter of the current frame includes at least one of an initial IC value of the current frame, an initial ITD value of the current frame, an initial IPD value of the current frame, an initial OPD value of the current frame, an initial ILD value of the current frame, and the like.

The initial multi-channel parameter of the current frame may be calculated in a plurality of manners. For details, refer to the other approaches. For example, a multi-channel parameter is an ITD value. The time-domain-based ITD value calculation manner shown in FIG. 3 or the frequency-domain-based ITD value calculation manner in FIG. 4 may be used in step 520. Alternatively, a hybrid-domain (time domain+frequency domain)-based ITD value calculation manner may be used based on the following formula:

$$ITD=\arg\max\left(IDFT\left(\frac{L_i(f)R_i^*(f)}{|L_i(f)R_i^*(f)|}\right)\right),$$

where $L_i(f)$ represents a frequency domain coefficient of a left-channel frequency-domain signal, $R_i^*(f)$ represents a conjugate of a frequency domain coefficient of a right-channel frequency-domain signal, arg max( ) means selecting a maximum value from a plurality of values, and IDFT( ) represents inverse DFT.

Step 530. Determine a difference parameter based on the initial multi-channel parameter of the current frame and multi-channel parameters of previous K frames of the current frame, where the difference parameter is used to represent a difference between the initial multi-channel parameter of the current frame and the multi-channel parameters of the previous K frames, and K is an integer greater than or equal to 1.

It should be understood that the previous K frames of the current frame are previous K frames closely adjacent to the current frame in all frames of a to-be-encoded audio signal. For example, assuming that the to-be-encoded audio signal includes 10 frames and K=1, if the current frame is a fifth frame in the 10 frames, the previous K frames of the current frame are a fourth frame in the 10 frames. For another example, assuming that the to-be-encoded audio signal includes 10 frames and K=2, if the current frame is a seventh frame in the 10 frames, the previous K frames of the current frame are a fifth frame and a sixth frame in the 10 frames.

Unless otherwise specified, previous K frames appearing in the following are previous K frames of a current frame, and a previous frame appearing in the following is a previous frame of a current frame.

Step 540. Determine a multi-channel parameter of the current frame based on the difference parameter and a characteristic parameter of the current frame.

It should be noted that the multi-channel parameter (including the initial multi-channel parameter) may be represented in a form of a numerical value. Therefore, the multi-channel parameter may also be referred to as a multi-channel parameter value.

In some embodiments, the characteristic parameter of the current frame may include a mono parameter of the current frame. The mono parameter may be used to represent a feature of a signal of a channel in the multi-channel signal of the current frame.

In some embodiments, the determining a multi-channel parameter of the current frame in step 540 may include modifying the initial multi-channel parameter to obtain the multi-channel parameter of the current frame. For example, the characteristic parameter of the current frame is the mono parameter of the current frame. Step 540 may include modifying the initial multi-channel parameter of the current frame based on the difference parameter and the mono parameter of the current frame, to obtain the multi-channel parameter of the current frame.

In some embodiments, the characteristic parameter of the current frame includes at least one of the following parameters of the current frame, a correlation parameter, a peak-to-average ratio parameter, a signal-to-noise ratio parameter, and a spectrum tilt parameter. The correlation parameter is used to represent a degree of correlation between the current frame and a previous frame. The peak-to-average ratio parameter is used to represent a peak-to-average ratio of a signal of at least one channel in the multi-channel signal of the current frame. The signal-to-noise ratio parameter is used to represent a signal-to-noise ratio of a signal of at least one channel in the multi-channel signal of the current frame. The spectrum tilt parameter is used to represent a spectrum tilt degree or a spectral energy change trend of a signal of at least one channel in the multi-channel signal of the current frame.

Step 550. Encode the multi-channel signal based on the multi-channel parameter of the current frame.

For example, operations, such as mono audio encoding, spatial parameter encoding, and bitstream multiplexing, shown in FIG. 1 may be performed. For a specific encoding scheme, refer to the other approaches.

In this embodiment of this application, the multi-channel parameter of the current frame is determined based on comprehensive consideration of the characteristic parameter of the current frame and the difference between the current frame and the previous K frames. This determining manner is more proper. Compared with a manner of directly reusing a multi-channel parameter of the previous frame for the current frame, this manner can better ensure accuracy of inter-channel information of a multi-channel signal.

The following describes an implementation of step 540 in detail.

Optionally, in some embodiments, step 540 may include if the difference parameter meets a first preset condition, adjusting a value of the initial multi-channel parameter of the current frame based on a value of the characteristic parameter of the current frame, to obtain the multi-channel parameter of the current frame.

Optionally, in some embodiments, step 540 may include, if the characteristic parameter of the current frame meets a first preset condition, adjusting a value of the initial multi-channel parameter of the current frame based on a value of the difference parameter, to obtain the multi-channel parameter of the current frame.

It should be understood that the first preset condition may be one condition, or may be a combination of a plurality of conditions. In addition, if the first preset condition is met, determining may be further performed based on another condition. If all conditions are met, a subsequent step is performed.

Optionally, in some embodiments, as shown in FIG. 6, step 540 may include the following sub steps.

Step 542. Determine whether the difference parameter meets a first preset condition.

Step 544. If the difference parameter meets the first preset condition, determine the multi-channel parameter of the current frame based on the characteristic parameter of the current frame.

It should be understood that the difference parameter may be defined in a plurality of manners. Different manners of defining the difference parameter may be corresponding to different first preset conditions. The following describes in detail the difference parameter and the first preset condition corresponding to the difference parameter.

Optionally, in some embodiments, the difference parameter may be a difference between the initial multi-channel parameter of the current frame and the multi-channel parameter of the previous frame, or an absolute value of the difference. The first preset condition may be that the difference parameter is greater than a preset first threshold. The first threshold may be 0.3 to 0.7 times of a target value. For example, the first threshold may be 0.5 times of the target value. The target value is a multi-channel parameter whose absolute value is larger in the multi-channel parameter of the previous frame and the initial multi-channel parameter of the current frame.

Optionally, in some embodiments, the difference parameter may be a difference between the initial multi-channel parameter of the current frame and an average value of the multi-channel parameters of the previous K frames, or an absolute value of the difference. The first preset condition may be that the difference parameter is greater than a preset first threshold. The first threshold may be 0.3 to 0.7 times of a target value. For example, the first threshold may be 0.5 times of the target value. The target value is a multi-channel parameter whose absolute value is larger in the multi-channel parameter of the previous frame and the initial multi-channel parameter of the current frame.

Optionally, in some embodiments, the difference parameter may be a product of the initial multi-channel parameter of the current frame and the multi-channel parameter of the previous frame, and the first preset condition may be that the difference parameter is less than or equal to 0.

The following describes a specific implementation of step 544 in detail.

Optionally, in some embodiments, step 544 may include determining the multi-channel parameter of the current frame based on the correlation parameter and/or the spectrum tilt parameter of the current frame, where the correlation parameter is used to represent the degree of correlation between the current frame and the previous frame, and the spectrum tilt parameter is used to represent the spectrum tilt degree or the spectral energy change trend of the signal of the at least one channel in the multi-channel signal of the current frame.

Optionally, in some embodiments, step 544 may include determining the multi-channel parameter of the current frame based on the correlation parameter and/or the peak-to-average ratio parameter of the current frame, where the correlation parameter is used to represent the degree of correlation between the current frame and the previous frame, and the peak-to-average ratio parameter is used to represent the peak-to-average ratio of the signal of the at least one channel in the multi-channel signal of the current frame.

The following describes the correlation parameter of the current frame in detail.

Further, the correlation parameter may be used to represent the degree of correlation between the current frame and the previous frame. The degree of correlation between the current frame and the previous frame may be represented in a plurality of manners. Different representation manners may be corresponding to different manners of calculating the correlation parameter. The following provides detailed descriptions with reference to specific embodiments.

Optionally, in some embodiments, the degree of correlation between the current frame and the previous frame may be represented using a degree of correlation between a target channel signal in the multi-channel signal of the current frame and a target channel signal in a multi-channel signal of the previous frame. It should be understood that the target channel signal of the current frame corresponds to the target channel signal of the previous frame. To be specific, if the target channel signal of the current frame is a left-channel signal, the target channel signal of the previous frame is a left-channel signal, if the target channel signal of the current frame is a right-channel signal, the target channel signal of the previous frame is a right-channel signal, or if the target channel signal of the current frame includes a left-channel signal and a right-channel signal, the target channel signal of the previous frame includes a left-channel signal and a right-channel signal. It should be further understood that the target channel signal may be a target channel time-domain signal or a target channel frequency-domain signal.

For example, the target channel signal is a frequency-domain signal. The determining the correlation parameter based on the target channel signal in the multi-channel signal of the current frame and the target channel signal in the multi-channel signal of the previous frame may further include determining the correlation parameter based on a frequency domain parameter of the target channel signal in the multi-channel signal of the current frame and a frequency domain parameter of the target channel signal in the multi-channel signal of the previous frame, where the frequency domain parameter of the target channel signal includes a frequency domain amplitude value and/or a frequency domain coefficient of the target channel signal.

In some embodiments, the frequency domain amplitude value of the target channel signal may be frequency domain amplitude values of some or all sub-bands of the target channel signal. For example, the frequency domain amplitude value of the target channel signal may be frequency domain amplitude values of sub-bands in a low frequency part of the target channel signal.

Further, for example, the target channel signal is a left-channel frequency-domain signal. Assuming that a low frequency part of the left-channel frequency-domain signal includes M sub-bands, and each sub-band includes N frequency domain amplitude values, normalized cross-correlation values of frequency domain amplitude values of sub-bands of the current frame and the previous frame may be calculated based on the following formula, to obtain M normalized cross-correlation values that are in a one-to-one correspondence with the M sub-bands:

$$cor(i) = \frac{\sum_{j=0}^{N-1}|L(i*N+j)|\cdot|L^{(-1)}(i*N+j)|}{\sqrt{\sum_{j=0}^{N-1}|L(i*N+j)|\cdot|L(i*N+j)|\cdot\sum_{j=0}^{N-1}|L^{(-1)}(i*N+j)|\cdot|L^{(-1)}(i*N+j)|}}\; i=0,1,\ldots,M-1,$$

where $|L(i*N+j)|$ represents a $j^{th}$ frequency domain amplitude value of an $i^{th}$ sub-band in a low frequency part of a left-channel frequency-domain signal of the current frame, $|L^{(-1)}(i*N+j)|$ represents a $j^{th}$ frequency domain amplitude value of an $i^{th}$ sub-band in a low frequency part of a left-channel frequency-domain signal of the previous frame, and cor(i) represents a normalized cross-correlation value of an $i^{th}$ sub-band in the M sub-bands.

Then, the M normalized cross-correlation values may be determined as the correlation parameter of the current frame and the previous frame, or a sum of the M normalized cross-correlation values or an average value of the M normalized cross-correlation values may be determined as the correlation parameter of the current frame.

In some embodiments, the foregoing manner of calculating the correlation parameter based on the frequency domain amplitude value may be replaced with a manner of calculating the correlation parameter based on the frequency domain coefficient.

In some embodiments, the foregoing manner of calculating the correlation parameter based on the frequency domain amplitude value may be replaced with a manner of calculating the correlation parameter based on an absolute value of the frequency domain coefficient.

It should be understood that the multi-channel signal of the current frame may be a multi-channel signal of one or more subframes of the current frame. Likewise, the multi-channel signal of the previous frame may be a multi-channel signal of one or more subframes of the previous frame. That is, the correlation parameter may be calculated based on all multi-channel signals of the current frame and all multi-channel signals of the previous frame, or may be calculated based on a multi-channel signal of one or some subframes of the current frame and a multi-channel signal of one or some subframes of the previous frame.

For example, the target channel signal includes a left-channel time-domain signal and a right-channel time-domain signal. A normalized cross-correlation value of a left-channel time-domain signal and a right-channel time-domain signal of the current frame and a left-channel time-domain signal and a right-channel time-domain signal of the previous frame at each sample may be calculated based on the following formula, to obtain N normalized cross-correlation values, and the N normalized cross-correlation values are searched for a maximum normalized cross-correlation value:

$$cor = \text{argmax}\left(\frac{\sum_{n=0}^{N}L(n)\cdot R(n-L)}{\sqrt{\sum_{n=0}^{N}L(n)\cdot R(n)\cdot\sum_{n=0}^{N}R(n-L)\cdot R(n-L)}}\right),$$

where L(n) represents the left-channel time-domain signal, R(n) represents the right-channel time-domain signal, N is a total quantity of samples of the left-channel time-domain signal, and L is a quantity of offset samples between an $n^{th}$ sample of the right-channel time-domain signal and an $n^{th}$ sample of the left-channel time-domain signal.

In some embodiments, the maximum normalized cross-correlation value calculated in the foregoing formula may be used as the correlation parameter of the current frame.

It should be understood that the multi-channel signal of the current frame may be a multi-channel signal of one or more subframes of the current frame. Likewise, the multi-channel signal of the previous frame may be a multi-channel signal of one or more subframes of the previous frame. For example, a plurality of maximum normalized cross-correlation values that are in a one-to-one correspondence with a plurality of subframes may be calculated based on the foregoing formula using a subframe as a unit. Then, one or more of the plurality of maximum normalized cross-correlation values, a sum of the plurality of maximum normalized cross-correlation values, or an average value of the plurality of maximum normalized cross-correlation values is used as the correlation parameter of the current frame.

The foregoing provides the manner of calculating the correlation parameter based on the time-domain signal. The following describes in detail a manner of calculating the correlation parameter based on a pitch period.

Optionally, in some embodiments, the degree of correlation between the current frame and the previous frame may be represented using a degree of correlation between a pitch period of the current frame and a pitch period of the previous frame. In this case, the correlation parameter may be determined based on the pitch period of the current frame and the pitch period of the previous frame.

In some embodiments, the pitch period of the current frame or the previous frame may include a pitch period of each subframe of the current frame or the previous frame.

Further, the pitch period of the current frame or a pitch period of each subframe of the current frame, and the pitch period of the previous frame or a pitch period of each subframe of the previous frame may be calculated based on an existing pitch period algorithm. Then, a deviation value between the pitch period of the current frame and the pitch period of each subframe of the previous frame or a deviation value between the pitch period of each subframe of the current frame and the pitch period of each subframe of the previous frame is calculated. Then, the calculated pitch period deviation value may be used as the correlation parameter of the current frame and the previous frame.

The following describes the peak-to-average ratio parameter of the current frame in detail.

The peak-to-average ratio parameter of the current frame may be used to represent the peak-to-average ratio of the signal of the at least one channel in the multi-channel signal of the current frame.

For example, the multi-channel signal includes a left-channel signal and a right-channel signal. The peak-to-average ratio parameter may be a peak-to-average ratio of the left-channel signal, or may be a peak-to-average ratio of the right-channel signal, or may be a combination of a peak-to-average ratio of the left-channel signal and a peak-to-average ratio of the right-channel signal.

The peak-to-average ratio parameter may be calculated in a plurality of manners. For example, the peak-to-average ratio parameter may be calculated based on a frequency domain amplitude value of a frequency-domain signal. For another example, the peak-to-average ratio parameter may be calculated based on a frequency domain coefficient of a frequency-domain signal or an absolute value of the frequency domain coefficient.

In some embodiments, the frequency domain amplitude value of the frequency-domain signal may be frequency domain amplitude values of some or all sub-bands of the frequency-domain signal. For example, the frequency domain amplitude value of the frequency-domain signal may be frequency domain amplitude values of sub-bands in a low frequency part of the frequency-domain signal.

A left-channel frequency-domain signal is used as an example. Assuming that a low frequency part of the left-channel frequency-domain signal includes M sub-bands, and each sub-band includes N frequency domain amplitude values, a peak-to-average ratio of the N frequency domain amplitude values of each sub-band may be calculated, to obtain M peak-to-average ratios that are in a one-to-one correspondence with the M sub-bands. Then, the M peak-to-average ratios, a sum of the M peak-to-average ratios, or an average value of the M peak-to-average ratios are/is used as the peak-to-average ratio parameter of the current frame. It should be noted that, in a process of calculating the peak-to-average ratio of each sub-band, to reduce calculation complexity, a ratio of a maximum frequency domain amplitude value of each sub-band to a sum of the N frequency domain amplitude values of each sub-band may be used as a peak-to-average ratio. When the peak-to-average ratio is compared with a preset threshold, the maximum frequency domain amplitude value may be compared with a product of the preset threshold and the sum of the N frequency domain amplitude values of each sub-band, or the maximum frequency domain amplitude value may be compared with a product of the preset threshold and an average value of the N frequency domain amplitude values of each sub-band.

In some embodiments, the multi-channel signal of the current frame may be a multi-channel signal of one or more subframes of the current frame.

The characteristic parameter of the current frame may further include the signal-to-noise ratio parameter of the current frame. The following describes the signal-to-noise ratio parameter in detail.

The signal-to-noise ratio parameter of the current frame may be used to represent the signal-to-noise ratio or a signal-to-noise ratio feature of the signal of the at least one channel in the multi-channel signal of the current frame.

It should be understood that the signal-to-noise ratio parameter of the current frame may include one or more parameters. A specific parameter selection manner is not limited in this embodiment of this application. For example, the signal-to-noise ratio parameter of the current frame may include at least one of a sub-band signal-to-noise ratio, a modified sub-band signal-to-noise ratio, a segmental signal-to-noise ratio, a modified segmental signal-to-noise ratio, a full-band signal-to-noise ratio, and a modified full-band signal-to-noise ratio of the multi-channel signal, and another parameter that can represent a signal-to-noise ratio feature of the multi-channel signal.

It should be noted that a manner of determining the signal-to-noise ratio parameter is not limited in this embodiment of this application.

For example, the signal-to-noise ratio parameter of the current frame may be calculated using all signals in the multi-channel signal.

For another example, the signal-to-noise ratio parameter of the current frame may be calculated using some signals in the multi-channel signal.

For another example, the signal-to-noise ratio parameter of the current frame may be calculated by adaptively selecting a signal of any channel in the multi-channel signal.

For another example, weighted averaging may be first performed on data representing the multi-channel signal, to form a new signal, and then the signal-to-noise ratio parameter of the current frame is represented using a signal-to-noise ratio of the new signal.

The characteristic parameter of the current frame may further include the spectrum tilt parameter of the current frame. The following describes the spectrum tilt parameter in detail.

The spectrum tilt parameter of the current frame may be used to represent the spectrum tilt degree or the spectral energy change trend of the signal of the at least one channel in the multi-channel signal of the current frame. It should be understood that a larger spectrum tilt degree indicates weaker signal voicing, and a smaller spectrum tilt degree indicates stronger signal voicing.

The following describes in detail a manner of determining the multi-channel parameter of the current frame based on the characteristic parameter of the current frame in step 544.

Optionally, in some embodiments, it may be determined, based on the characteristic parameter of the current frame, whether to reuse the multi-channel parameter of the previous frame for the current frame.

For example, if the characteristic parameter meets a second preset condition, the multi-channel parameter of the previous frame is reused for the current frame. Alternatively, if the characteristic parameter does not meet the second preset condition, the initial multi-channel parameter of the current frame is used as the multi-channel parameter of the current frame. It should be understood that a processing manner used when the characteristic parameter does not meet the second preset condition is not limited in this embodiment of this application. For example, the initial multi-channel parameter may be modified in another existing manner.

Optionally, in some embodiments, it may be determined, based on the characteristic parameter of the current frame, whether to determine the multi-channel parameter of the current frame based on a change trend of multi-channel parameters of previous T frames, where T is greater than or equal to 2.

For example, if the characteristic parameter meets a second preset condition, the multi-channel parameter of the current frame is determined based on the change trend of the multi-channel parameters of the previous T frames. Alternatively, if the characteristic parameter does not meet the second preset condition, the initial multi-channel parameter of the current frame is used as the multi-channel parameter of the current frame. It should be understood that a processing manner used when the characteristic parameter does not meet the second preset condition is not limited in this embodiment of this application. For example, the initial multi-channel parameter may be modified in another existing manner.

It should be understood that the second preset condition may be one condition, or may be a combination of a plurality of conditions. In addition, if the second preset condition is met, determining may be further performed based on another condition. If all conditions are met, a subsequent step is performed.

It should be understood that the previous T frames of the current frame are previous T frames closely adjacent to the current frame in all the frames of the to-be-encoded audio signal. For example, if the to-be-encoded audio signal includes 10 frames, T=2, and the current frame is a fifth frame in the 10 frames, the previous T frames of the current frame are a third frame and a fourth frame in the 10 frames.

It should be understood that the multi-channel parameter of the current frame may be determined based on the change trend of the multi-channel parameters of the previous T frames in a plurality of manners. For example, the multi-channel parameter is an ITD value. An ITD value ITD[i] of the current frame may be calculated in the following manner:

$$ITD[i]=ITD[i-1]+\text{delta},$$

where delta=ITD[i−1]-ITD[i−2], ITD[i−1] represents an ITD value of the previous frame of the current frame, and ITD[i−2] represents an ITD value of a previous frame of the previous frame of the current frame.

The following describes the foregoing second preset condition in detail.

It should be understood that the second preset condition may be defined in a plurality of manners, and setting of the second preset condition is related to selection of the characteristic parameter. This is not limited in this embodiment of this application.

For example, the characteristic parameter is the correlation parameter and/or the peak-to-average ratio parameter, the correlation parameter is an average value of correlation values of the multi-channel signal of the current frame and the multi-channel signal of the previous frame in sub-bands, and the peak-to-average ratio parameter is an average value of peak-to-average ratios of the multi-channel signal of the current frame in the sub-bands. The second preset condition may be one or more of the following conditions the correlation parameter is greater than a second threshold, where a value range of the second threshold may be, for example, 0.6 to 0.95, for example, the second threshold may be 0.85, the peak-to-average ratio parameter is greater than a third threshold, where a value range of the third threshold may be, for example, 0.4 to 0.8, for example, the third threshold may be 0.6, the correlation parameter is greater than a fourth threshold, and a correlation value in a sub-band is greater than a fifth threshold, where a value range of the fourth threshold may be 0.6 to 0.85, for example, the fourth threshold may be 0.7, and a value range of the fifth threshold may be 0.8 to 0.95, for example, the fifth threshold may be 0.9, and the peak-to-average ratio parameter is greater than a sixth threshold, and a peak-to-average ratio in a sub-band is greater than a seventh threshold, where a value range of the sixth threshold may be 0.4 to 0.75, for example, the sixth threshold may be 0.55, and a value range of the seventh threshold may be 0.6 to 0.9, for example, the seventh threshold may be 0.7.

The second threshold may be greater than the fourth threshold, and the fourth threshold may be less than the fifth threshold, or the third threshold may be greater than the sixth threshold, and the sixth threshold may be less than the seventh threshold.

It should be noted that, if the characteristic parameter includes the peak-to-average ratio parameter, and the second preset condition includes that the peak-to-average ratio parameter is greater than or equal to a preset threshold, a value relationship between the peak-to-average ratio parameter and the preset threshold needs to be determined. To simplify calculation, a process of comparing the peak-to-average ratio parameter with the preset threshold may be converted into comparison between a peak value of peak-to-average ratios and a target value. The target value may be a product of the preset threshold and an average value of the peak-to-average ratios, or may be a product of the preset threshold and a sum of parameters used to calculate the peak-to-average ratios. For example, the parameters used to calculate the peak-to-average ratios are frequency domain amplitude values of sub-bands, and each sub-band includes N frequency domain amplitude values. When the peak-to-average ratios are compared with the preset threshold, a maximum frequency domain amplitude value of each sub-band may be compared with a product of the preset threshold and a sum of the N frequency domain amplitude values of each sub-band, or a maximum frequency domain amplitude value of each sub-band may be compared with a product of the preset threshold and an average value of the N frequency domain amplitude values of each sub-band.

Figure 7:
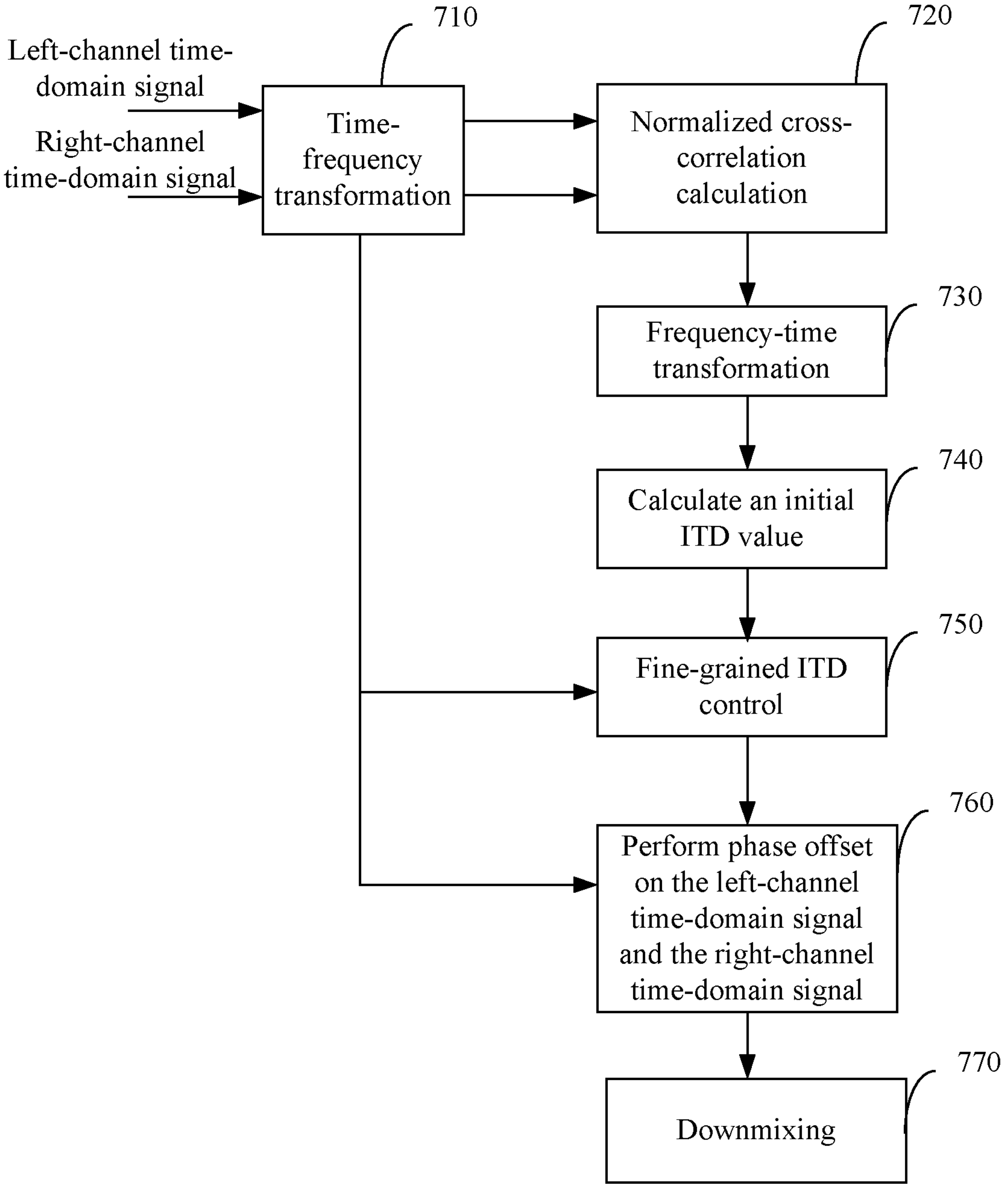
FIG. 7 is a schematic flowchart of a multi-channel signal encoding method according to an embodiment of this application.

The following describes the embodiments of this application in a more detailed manner with reference to an example in FIG. 7. FIG. 7 is described mainly using an example in which a multi-channel signal of a current frame includes a left-channel signal and a right-channel signal, and a multi-channel parameter is an ITD value. It should be noted that the example in FIG. 7 is merely intended to help a person skilled in the art understand the embodiments of this application, but not intended to limit the embodiments of this application to a specific value or a specific scenario that is listed as an example. Obviously, a person skilled in the art may perform various equivalent modifications or variations based on the provided example in FIG. 7, and such modifications or variations also fall within the scope of the embodiments of this application.

FIG. 7 is a schematic flowchart of a multi-channel signal encoding method according to an embodiment of this application. It should be understood that processing steps or operations shown in FIG. 7 are merely examples, and other operations or variations of the operations in FIG. 7 may be further performed in this embodiment of this application. In addition, the steps in FIG. 7 may be performed in a sequence different from that shown in FIG. 7, and some operations in FIG. 7 may not need to be performed.

The method in FIG. 7 includes the following steps.

Step 710: Perform time-frequency transformation on a left-channel time-domain signal and a right-channel time-domain signal of a current frame to obtain a left-channel frequency-domain signal and a right-channel frequency-domain signal.

Step 720: Perform a normalized cross-correlation operation on the left-channel frequency-domain signal and the right-channel frequency-domain signal to obtain a target frequency-domain signal.

Step 730: Perform frequency-time transformation on the target frequency-domain signal to obtain a target time-domain signal.

Step 740: Determine an initial ITD value of the current frame based on the target time-domain signal.

A process described in steps 720 to 740 may be represented using the following formula:

$$ITD = \text{argmax}\left(IDFT\left(\frac{L_i(f)R_i^*(f)}{|L_i(f)R_i^*(f)|}\right)\right),$$

where $L_i(f)$ represents a frequency domain coefficient of the left-channel frequency-domain signal, $R_i^*(f)$ represents a conjugate of a frequency domain coefficient of the right-channel frequency-domain signal, argmax( ) means selecting a maximum value from a plurality of values, and IDFT( ) represents inverse DFT.

Step 750: Perform fine-grained ITD control to calculate an ITD value of the current frame.

Step 760: Perform phase offset on the left-channel time-domain signal and the right-channel time-domain signal based on the ITD value of the current frame.

Step 770: Perform downmixing on a left-channel time-domain signal and a right-channel time-domain signal.

For implementations of steps 760 and 770, refer to the other approaches. Details are not described herein.

Step 750 corresponds to step 540 in FIG. 5. Any implementation provided in step 530 may be used for step 750. The following lists several optional implementations.

Implementation 1:

Step 1: Divide a low frequency part of the left-channel frequency-domain signal of the current frame into M sub-bands, where each sub-band includes N frequency domain amplitude values.

Step 2: Calculate a correlation parameter of the current frame and a previous frame based on the following formula:

$$cor(i) = \frac{\sum_{j=0}^{N-1} |L(i*N+j)| \cdot \left|L^{(-1)}(i*N+j)\right|}{\sqrt{\sum_{j=0}^{N-1} |L(i*N+j)| \cdot |L(i*N+j)| \cdot \sum_{j=0}^{N-1} \left|L^{(-1)}(i*N+j)\right| \cdot \left|L^{(-1)}(i*N+j)\right|}} \; i = 0, 1, \ldots, M-1,$$

where |L(i*N+j)| represents a $i^{th}$ frequency domain amplitude value of an $i^{th}$ sub-band in the low frequency part of the left-channel frequency-domain signal of the current frame, $|L^{(-1)}(i*N+j)|$ represents a $i^{th}$ frequency domain amplitude value of an $i^{th}$ sub-band in a low frequency part of a left-channel frequency-domain signal of the previous frame, and cor(i) represents a normalized cross-correlation value corresponding to an $i^{th}$ sub-band in the M sub-bands.

It should be understood that the correlation parameter of the current frame and the previous frame is obtained through calculation in step 2. The correlation parameter may be a normalized cross-correlation value of each sub-band, or may be an average value of normalized cross-correlation values of the sub-bands.

Step 3: Calculate a peak-to-average ratio of each sub-band of the current frame.

It should be understood that step 2 and step 3 may be performed simultaneously, or may be performed sequentially. In addition, the peak-to-average ratio of each sub-band may be represented using a ratio of a peak value of the frequency domain amplitude values of each sub-band to an average value of the frequency domain amplitude values of each sub-band, or may be represented using a ratio of a peak value of the frequency domain amplitude values of each sub-band to a sum of the frequency domain amplitude values of the sub-band. This can reduce calculation complexity.

It should be understood that a peak-to-average ratio parameter of a multi-channel signal of the current frame may be obtained through calculation in step 3. The peak-to-average ratio parameter may be the peak-to-average ratio of each sub-band, a sum of peak-to-average ratios of the sub-bands, or an average value of peak-to-average ratios of the sub-bands.

Step 4: If the initial ITD value of the current frame and an ITD value of the previous frame meet a first preset condition, determine, based on the correlation parameter and/or a peak-to-average ratio parameter of the current frame, whether to reuse the ITD value of the previous frame for the current frame.

For example, the first preset condition may be a product of the ITD value of the previous frame and the initial ITD value of the current frame is 0, a product of the ITD value of the previous frame and the initial ITD value of the current frame is negative, or an absolute value of a difference between the ITD value of the previous frame and the initial ITD value of the current frame is greater than half of a target value, where the target value is an ITD value whose absolute value is larger in the ITD value of the previous frame and the initial ITD value of the current frame.

It should be noted that the first preset condition may be one condition, or may be a combination of a plurality of conditions. In addition, if the first preset condition is met, determining may be further performed based on another condition. If all conditions are met, a subsequent step is performed.

The determining, based on the correlation parameter and/or a peak-to-average ratio parameter of the current frame, whether to reuse the ITD value of the previous frame for the current frame may be determining whether the correlation parameter and/or the peak-to-average ratio parameter of the current frame meet/meets a second preset condition, and if the correlation parameter and/or the peak-to-average ratio parameter of the current frame meet/meets the second preset condition, reusing the ITD value of the previous frame for the current frame.

For example, the second preset condition may be, the average value of the normalized cross-correlation values of the sub-bands is greater than a first threshold, the average value of the peak-to-average ratios of the sub-bands is greater than a second threshold, the average value of the normalized cross-correlation values of the sub-bands is greater than a third threshold, and a normalized cross-correlation value of a sub-band is greater than a fourth threshold, or the average value of the peak-to-average ratios of the sub-bands is greater than a fifth threshold, and a peak-to-average ratio of a sub-band is greater than a sixth threshold.

The first threshold is greater than the third threshold, and the third threshold is less than the fourth threshold, or the second threshold is greater than the fifth threshold, and the fifth threshold is less than the sixth threshold.

It should be noted that the second preset condition may be one condition, or may be a combination of a plurality of conditions. In addition, if the second preset condition is met, determining may be further performed based on another condition. If all conditions are met, a subsequent step is performed.

It should be noted that the foregoing described left-channel frequency-domain signal of the current frame may be a left-channel frequency-domain signal of one or some subframes of the current frame, and the foregoing described left-channel frequency-domain signal of the previous frame may be a left-channel frequency-domain signal of one or some subframes of the previous frame. That is, the correlation parameter may be calculated using a parameter of the current frame and a parameter of the previous frame, or may be calculated using a parameter of one or some subframes of the current frame and a parameter of one or some subframes of the previous frame. Likewise, the peak-to-average ratio parameter may be calculated using a parameter of the current frame, or may be calculated using a parameter of one or some subframes of the current frame.

Implementation 2:

A difference between the implementation 2 and the foregoing implementation is as follows. In the foregoing implementation, the correlation parameter of the current frame and the previous frame is calculated based on the frequency domain amplitude values of the sub-bands, but in the implementation 2, the correlation parameter of the current frame and the previous frame is calculated based on a frequency domain coefficient of a sub-band or an absolute value of the frequency domain coefficient. A specific implementation process of the implementation 2 is similar to that of the foregoing implementation. Details are not described herein.

Implementation 3:

A difference between the implementation 3 and the foregoing implementation is as follows. In the foregoing implementation, the peak-to-average ratio parameter is calculated based on the frequency domain amplitude values of the sub-bands, but in the implementation 3, the peak-to-average ratio parameter is calculated based on an absolute value of a frequency domain coefficient of a sub-band. A specific implementation process of the implementation 3 is similar to that of the foregoing implementation. Details are not described herein.

Implementation 4:

A difference between the implementation 4 and the foregoing implementation is as follows. In the foregoing implementation, the correlation parameter and/or the peak-to-average ratio parameter are/is calculated based on the left-channel frequency-domain signal, but in the implementation 4, the correlation parameter and/or the peak-to-average ratio parameter are/is calculated based on a right-channel frequency-domain signal. A specific implementation process of the implementation 4 is similar to that of the foregoing implementation. Details are not described herein.

Implementation 5:

A difference between the implementation 5 and the foregoing implementation is as follows. In the foregoing implementation, the correlation parameter and/or the peak-to-average ratio parameter are/is calculated based on the left-channel frequency-domain signal or the right-channel frequency-domain signal, but in the implementation 5, the correlation parameter and/or the peak-to-average ratio parameter are/is calculated based on the left-channel frequency-domain signal and the right-channel frequency-domain signal.

During specific implementation, a group of correlation parameter and/or peak-to-average ratio parameter may be calculated based on the left-channel frequency-domain signal, and then a group of correlation parameter and/or peak-to-average ratio parameter is calculated using the right-channel frequency-domain signal. Then, a larger one of the two groups of parameters may be selected as a final correlation parameter and/or peak-to-average ratio parameter. Another process of the implementation 5 is similar to that of the foregoing implementation. Details are not described herein.

Implementation 6:

A difference between the implementation 6 and the foregoing implementation is as follows. In the foregoing implementation, the correlation parameter is calculated based on the frequency-domain signals, but in the implementation 6, the correlation parameter is calculated based on time-domain signals.

Further, the correlation parameter of the current frame and the previous frame may be calculated using the following formula:

$$cor = \operatorname{argmax}\left(\frac{\sum_{n=0}^{N} L(n)\cdot R(n-L)}{\sqrt{\sum_{n=0}^{N} L(n)\cdot R(n)\cdot \sum_{n=0}^{N} R(n-L)\cdot R(n-L)}}\right),$$

where L(n) represents a left-channel time-domain signal, R(n) represents a right-channel time-domain signal, N is a total quantity of samples of the left-channel time-domain signal, and L is a quantity of offset samples between an $n^{th}$ sample of the right-channel signal and an $n^{th}$ sample of the left channel.

It should be understood that the left-channel time-domain signal and the right-channel time-domain signal herein may be all left-channel signals and right-channel signals of the current frame, or may be a left-channel signal and a right-channel signal of one or some subframes of the current frame.

Another implementation process of the implementation 6 is similar to that of the foregoing implementation. Details are not described herein.

Implementation 7:

A difference between the implementation 7 and the foregoing implementation is as follows. In the foregoing implementation, it needs to be determined whether to reuse the ITD value of the previous frame for the current frame, but in the implementation 7, it needs to be determined whether to estimate the ITD value of the current frame based on a change trend of ITD values of previous T frames of the current frame, where T is an integer greater than or equal to 2. The ITD value ITD[i] of the current frame may be calculated in the following manner:

$$ITD[i]=ITD[i-1]+\text{delta},$$

where delta=ITD[i−1]-ITD[i−2], ITD[i−1] represents the ITD value of the previous frame of the current frame, and ITD[i−2] represents an ITD value of a previous frame of the previous frame of the current frame.

Implementation 8:

A difference between the implementation 8 and the foregoing implementation is as follows. In the foregoing implementation, the correlation parameter of the current frame and the previous frame is calculated based on the time/frequency signals of the current frame and the previous frame, but in the implementation 8, the correlation parameter is calculated based on pitch periods of the current frame and the previous frame.

Further, a pitch period of the current frame and a pitch period of the corresponding previous frame may be calculated based on an existing pitch period algorithm, a deviation between the pitch period of the current frame and the pitch period of the previous frame is calculated, and the deviation between the pitch period of the current frame and the pitch period of the previous frame is used as the correlation parameter of the current frame and the previous frame.

It should be understood that the deviation between the pitch period of the current frame and the pitch period of the previous frame may be a deviation between an overall pitch period of the current frame and an overall pitch period of the previous frame, or may be a deviation between a pitch period of one or some subframes of the current frame and a pitch period of one or some subframes of the previous frame, or may be a sum of deviations between pitch periods of some subframes of the current frame and pitch periods of some subframes of the previous frame, or may be an average value of deviations between pitch periods of some subframes of the current frame and pitch periods of some subframes of the previous frame.

Implementation 9:

A difference between the implementation 9 and the foregoing implementation is as follows. In the foregoing implementation, the ITD value of the current frame is determined based on the correlation parameter and/or the peak-to-average ratio parameter, but in the implementation 9, the ITD value of the current frame is determined based on the correlation parameter and/or a spectrum tilt parameter.

In this case, a second preset condition may be a correlation value of the correlation parameter of the current frame and the previous frame is greater than a threshold, and/or a spectrum tilt value of the spectrum tilt parameter is less than a threshold (it should be understood that a larger spectrum tilt value indicates weaker signal voicing, and a smaller spectrum tilt value indicates stronger signal voicing).

Another process of the implementation 9 is similar to that of the foregoing implementation. Details are not described herein.

Implementation 10:

A difference between the implementation 10 and the foregoing implementation is as follows. In the foregoing implementation, the ITD value of the current frame is calculated, but in the implementation 10, an IPD value of the current frame is calculated. It should be understood that the ITD value-related calculation process in steps 710 to 770 needs to be replaced with an IPD value-related process. For a manner of calculating the IPD value, refer to the other approaches. Details are not described herein.

Another process of the implementation 10 is roughly similar to that of the foregoing implementation. Details are not described herein.

It should be understood that the foregoing 10 implementations are merely examples for description. In practice, these implementations may be replaced or combined with each other to obtain a new implementation. For brevity, examples are not listed one by one herein.

The following describes apparatus embodiments of this application. The apparatus embodiments may be used to perform the foregoing methods. Therefore, for a part not described in detail, refer to the foregoing method embodiments.

Figure 8:
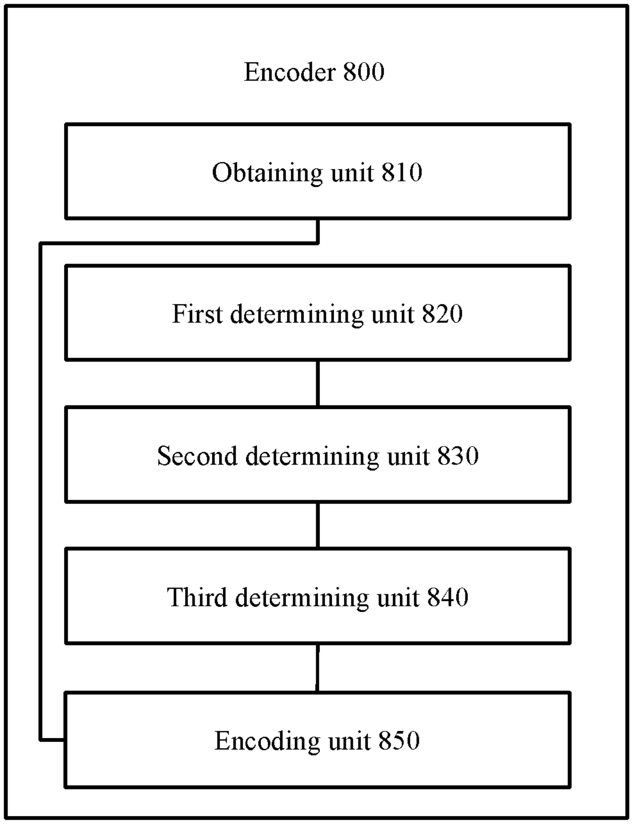
FIG. 8 is a schematic block diagram of an encoder according to an embodiment of this application.

FIG. 8 is a schematic block diagram of an encoder according to an embodiment of this application. An encoder 800 in FIG. 8 includes an obtaining unit 810 configured to obtain a multi-channel signal of a current frame, a first determining unit 820 configured to determine an initial multi-channel parameter of the current frame, a second determining unit 830 configured to determine a difference parameter based on the initial multi-channel parameter of the current frame and multi-channel parameters of previous K frames of the current frame, where the difference parameter is used to represent a difference between the initial multi-channel parameter of the current frame and the multi-channel parameters of the previous K frames, and K is an integer greater than or equal to 1, a third determining unit 840 configured to determine a multi-channel parameter of the current frame based on the difference parameter and a characteristic parameter of the current frame, and an encoding unit 850 configured to encode the multi-channel signal based on the multi-channel parameter of the current frame.

In this embodiment of this application, the multi-channel parameter of the current frame is determined based on comprehensive consideration of the characteristic parameter of the current frame and the difference between the current frame and the previous K frames. This determining manner is more proper. Compared with a manner of directly reusing a multi-channel parameter of a previous frame for the current frame, this manner can better ensure accuracy of inter-channel information of a multi-channel signal.

Optionally, in some embodiments, the third determining unit 840 is further configured to, if the difference parameter meets a first preset condition, determine the multi-channel parameter of the current frame based on the characteristic parameter of the current frame.

Optionally, in some embodiments, the difference parameter is an absolute value of a difference between the initial multi-channel parameter of the current frame and a multi-channel parameter of a previous frame of the current frame, and the first preset condition is that the difference parameter is greater than a preset first threshold.

Optionally, in some embodiments, the difference parameter is a product of the initial multi-channel parameter of the current frame and a multi-channel parameter of a previous frame of the current frame, and the first preset condition is that the difference parameter is less than or equal to 0.

Optionally, in some embodiments, the third determining unit 840 is further configured to determine the multi-channel parameter of the current frame based on a correlation parameter of the current frame, where the correlation parameter is used to represent a degree of correlation between the current frame and the previous frame of the current frame.

Optionally, in some embodiments, the third determining unit 840 is further configured to determine the multi-channel parameter of the current frame based on a peak-to-average ratio parameter of the current frame, where the peak-to-average ratio parameter is used to represent a peak-to-average ratio of a signal of at least one channel in the multi-channel signal of the current frame.

Optionally, in some embodiments, the third determining unit 840 is further configured to determine the multi-channel parameter of the current frame based on a correlation parameter and a peak-to-average ratio parameter of the current frame, where the correlation parameter is used to represent a degree of correlation between the current frame and the previous frame of the current frame, and the peak-to-average ratio parameter is used to represent a peak-to-average ratio of a signal of at least one channel in the multi-channel signal of the current frame.

Optionally, in some embodiments, the encoder 800 further includes a fourth determining unit (not shown) configured to determine the correlation parameter based on a target channel signal in the multi-channel signal of the current frame and a target channel signal in a multi-channel signal of the previous frame.

Optionally, in some embodiments, the fourth determining unit is further configured to determine the correlation parameter based on a frequency domain parameter of the target channel signal in the multi-channel signal of the current frame and a frequency domain parameter of the target channel signal in the multi-channel signal of the previous frame, where the frequency domain parameter is at least one of a frequency domain amplitude value and a frequency domain coefficient of the target channel signal.

Optionally, in some embodiments, the encoder 800 further includes a fifth determining unit (not shown) configured to determine the correlation parameter based on a pitch period of the current frame and a pitch period of the previous frame.

Optionally, in some embodiments, the third determining unit 840 is further configured to, if the characteristic parameter meets a second preset condition, determine the multi-channel parameter of the current frame based on multi-channel parameters of previous T frames of the current frame, where T is an integer greater than or equal to 1.

Optionally, in some embodiments, the third determining unit 840 is further configured to determine the multi-channel parameters of the previous T frames as the multi-channel parameter of the current frame, where T is equal to 1.

Optionally, in some embodiments, the third determining unit 840 is further configured to determine the multi-channel parameter of the current frame based on a change trend of the multi-channel parameters of the previous T frames, where T is greater than or equal to 2.

Optionally, in some embodiments, the characteristic parameter includes the correlation parameter and/or the peak-to-average ratio parameter of the current frame, where the correlation parameter is used to represent the degree of correlation between the current frame and the previous frame of the current frame, and the peak-to-average ratio parameter is used to represent the peak-to-average ratio of the signal of the at least one channel in the multi-channel signal of the current frame, and the second preset condition is that the characteristic parameter is greater than a preset threshold.

Optionally, in some embodiments, the initial multi-channel parameter of the current frame includes at least one of an initial IC value of the current frame, an initial ITD value of the current frame, an initial IPD value of the current frame, an initial OPD value of the current frame, and an initial ILD value of the current frame.

Optionally, in some embodiments, the characteristic parameter of the current frame includes at least one of the following parameters of the current frame, the correlation parameter, the peak-to-average ratio parameter, a signal-to-noise ratio parameter, and a spectrum tilt parameter, where the correlation parameter is used to represent the degree of correlation between the current frame and the previous frame, the peak-to-average ratio parameter is used to represent the peak-to-average ratio of the signal of the at least one channel in the multi-channel signal of the current frame, the signal-to-noise ratio parameter is used to represent a signal-to-noise ratio of a signal of at least one channel in the multi-channel signal of the current frame, and the spectrum tilt parameter is used to represent a spectrum tilt degree of a signal of at least one channel in the multi-channel signal of the current frame.

Figure 9:
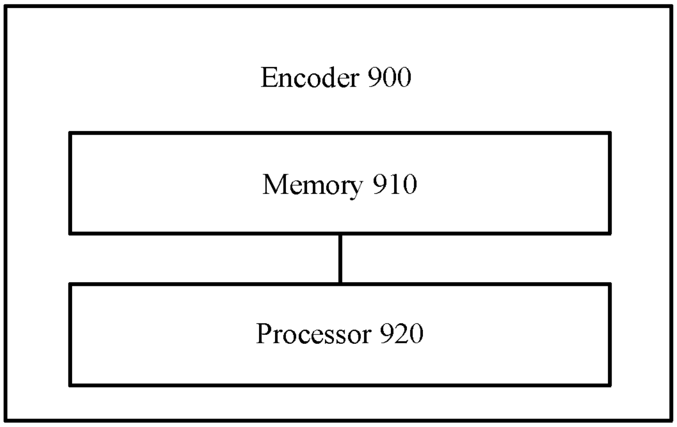
FIG. 9 is a schematic structural diagram of an encoder according to an embodiment of this application.

FIG. 9 is a schematic block diagram of an encoder according to an embodiment of this application. An encoder 900 in FIG. 9 includes a memory 910 configured to store a program, and a processor 920 configured to execute the program. When the program is executed, the processor 920 is configured to obtain a multi-channel signal of a current frame, determine an initial multi-channel parameter of the current frame, determine a difference parameter based on the initial multi-channel parameter of the current frame and multi-channel parameters of previous K frames of the current frame, where the difference parameter is used to represent a difference between the initial multi-channel parameter of the current frame and the multi-channel parameters of the previous K frames, and K is an integer greater than or equal to 1, determine a multi-channel parameter of the current frame based on the difference parameter and a characteristic parameter of the current frame, and encode the multi-channel signal based on the multi-channel parameter of the current frame.

In this embodiment of this application, the multi-channel parameter of the current frame is determined based on comprehensive consideration of the characteristic parameter of the current frame and the difference between the current frame and the previous K frames. This determining manner is more proper. Compared with a manner of directly reusing a multi-channel parameter of a previous frame for the current frame, this manner can better ensure accuracy of inter-channel information of a multi-channel signal.

Optionally, in some embodiments, the processor 920 is further configured to, if the difference parameter meets a first preset condition, determine the multi-channel parameter of the current frame based on the characteristic parameter of the current frame.

Optionally, in some embodiments, the difference parameter is an absolute value of a difference between the initial multi-channel parameter of the current frame and a multi-channel parameter of a previous frame of the current frame, and the first preset condition is that the difference parameter is greater than a preset first threshold.

Optionally, in some embodiments, the difference parameter is a product of the initial multi-channel parameter of the current frame and a multi-channel parameter of a previous frame of the current frame, and the first preset condition is that the difference parameter is less than or equal to 0.

Optionally, in some embodiments, the processor 920 is further configured to determine the multi-channel parameter of the current frame based on a correlation parameter of the current frame, where the correlation parameter is used to represent a degree of correlation between the current frame and the previous frame of the current frame.

Optionally, in some embodiments, the processor 920 is further configured to determine the multi-channel parameter of the current frame based on a peak-to-average ratio parameter of the current frame, where the peak-to-average ratio parameter is used to represent a peak-to-average ratio of a signal of at least one channel in the multi-channel signal of the current frame.

Optionally, in some embodiments, the processor 920 is further configured to determine the multi-channel parameter of the current frame based on a correlation parameter and a peak-to-average ratio parameter of the current frame, where the correlation parameter is used to represent a degree of correlation between the current frame and the previous frame of the current frame, and the peak-to-average ratio parameter is used to represent a peak-to-average ratio of a signal of at least one channel in the multi-channel signal of the current frame.

Optionally, in some embodiments, the processor 920 is further configured to determine the correlation parameter based on a target channel signal in the multi-channel signal of the current frame and a target channel signal in a multi-channel signal of the previous frame.

Optionally, in some embodiments, the processor 920 is further configured to determine the correlation parameter based on a frequency domain parameter of the target channel signal in the multi-channel signal of the current frame and a frequency domain parameter of the target channel signal in the multi-channel signal of the previous frame, where the frequency domain parameter is a frequency domain amplitude value of the target channel signal.

Optionally, in some embodiments, the processor 920 is further configured to determine the correlation parameter based on a frequency domain parameter of the target channel signal in the multi-channel signal of the current frame and a frequency domain parameter of the target channel signal in the multi-channel signal of the previous frame, where the frequency domain parameter is a frequency domain coefficient of the target channel signal.

Optionally, in some embodiments, the processor 920 is further configured to determine the correlation parameter based on a frequency domain parameter of the target channel signal in the multi-channel signal of the current frame and a frequency domain parameter of the target channel signal in the multi-channel signal of the previous frame, where the frequency domain parameter is a frequency domain amplitude value and a frequency domain coefficient of the target channel signal.

Optionally, in some embodiments, the processor 920 is further configured to determine the correlation parameter based on a pitch period of the current frame and a pitch period of the previous frame.

Optionally, in some embodiments, the processor 920 is further configured to, if the characteristic parameter meets a second preset condition, determine the multi-channel parameter of the current frame based on multi-channel parameters of previous T frames of the current frame, where T is an integer greater than or equal to 1.

Optionally, in some embodiments, the processor 920 is further configured to determine the multi-channel parameters of the previous T frames as the multi-channel parameter of the current frame, where T is equal to 1.

Optionally, in some embodiments, the processor 920 is further configured to determine the multi-channel parameter of the current frame based on a change trend of the multi-channel parameters of the previous T frames, where T is greater than or equal to 2.

Optionally, in some embodiments, the characteristic parameter includes the correlation parameter and/or the peak-to-average ratio parameter of the current frame, where the correlation parameter is used to represent the degree of correlation between the current frame and the previous frame of the current frame, and the peak-to-average ratio parameter is used to represent the peak-to-average ratio of the signal of the at least one channel in the multi-channel signal of the current frame, and the second preset condition is that the characteristic parameter is greater than a preset threshold.

Optionally, in some embodiments, the initial multi-channel parameter of the current frame includes at least one of an initial IC value of the current frame, an initial ITD value of the current frame, an initial IPD value of the current frame, an initial OPD value of the current frame, and an initial ILD value of the current frame.

Optionally, in some embodiments, the characteristic parameter of the current frame includes at least one of the following parameters of the current frame, the correlation parameter, the peak-to-average ratio parameter, a signal-to-noise ratio parameter, and a spectrum tilt parameter, where the correlation parameter is used to represent the degree of correlation between the current frame and the previous frame, the peak-to-average ratio parameter is used to represent the peak-to-average ratio of the signal of the at least one channel in the multi-channel signal of the current frame, the signal-to-noise ratio parameter is used to represent a signal-to-noise ratio of a signal of at least one channel in the multi-channel signal of the current frame, and the spectrum tilt parameter is used to represent a spectrum tilt degree of a signal of at least one channel in the multi-channel signal of the current frame.

The term "and/or" in this specification indicates that three relationships may exist. For example, A and/or B may indicate the following three cases, A exists alone, both A and B exist, and B exists alone. In addition, the character "/" in this specification usually indicates that associated objects are in an "or" relationship.

A person of ordinary skill in the art may be aware that, with reference to the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for detailed working processes of the foregoing described system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separated, and parts displayed as units may or may not be physical units, that is, may be located in one place, or may be distributed on a plurality of network units. Some or all of the units may be selected based on actual requirements to achieve the objectives of the solutions of the embodiments.

In addition, the functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The computer software product is stored in a storage medium, and includes several instructions for instructing a computer device (that may be a personal computer, a server, a network device, or the like) to perform all or some of the steps of the methods described in the embodiments of this application. The storage medium includes any medium that can store program code, such as a Universal Serial Bus (USB) flash drive, a removable hard disk, a read-only memory (ROM), a random-access memory (RAM), a magnetic disk, or an optical disc.

The foregoing descriptions are implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method performed by an audio encoder comprising a processor, wherein the method comprises:

obtaining a first multi-channel audio signal of a current frame originating from a microphone;

determining a first multi-channel parameter of the current frame, wherein the first multi-channel parameter comprises an initial inter-channel time difference (ITD) value of the current frame in a hybrid-domain and is based on the following formula:

$$ITD = \text{argmax}\left(IDFT\left(\frac{L_i(f)R_i^*(f)}{|L_i(f)R_i^*(f)|}\right)\right),$$

wherein ITD is the ITD value, wherein $L_i(f)$ represents a first frequency domain coefficient of a left-channel frequency-domain signal of the first multi-channel audio signal, wherein $R^*_i(f)$ represents a conjugate of a second frequency domain coefficient of a right-channel frequency-domain signal of the first multi-channel audio signal, wherein argmax( ) is a maximum value from a plurality of values, and wherein IDFT() represents an inverse discrete Fourier transform operation;

determining a first difference parameter based on first differences between the first multi-channel parameter and second multi-channel parameters of previous K frames of the current frame, wherein K is an integer greater than or equal to 1;

determining a third multi-channel parameter of the current frame based on the first difference parameter and a characteristic parameter of the current frame; and encoding, based on the third multi-channel parameter, the first multi-channel audio signal into a bitstream.

2. The method of claim 1, further comprising further determining the third multi-channel parameter when the first difference parameter meets a first preset condition.

3. The method of claim 2, wherein the first difference parameter is an absolute value of a second difference between the first multi-channel parameter and a fourth multi-channel parameter of a previous frame of the previous K frames, wherein the first preset condition is that the first difference parameter is greater than a preset first threshold or a product of the first multi-channel parameter and the fourth multi-channel parameter, wherein the first preset condition is that the first difference parameter is less than or equal to 0.

4. The method of claim 2, further comprising further determining the third multi-channel parameter using a correlation parameter of the current frame, wherein the correlation parameter represents a degree of correlation between the current frame and a previous frame of the previous K frames.

5. The method of claim 4, further comprising determining the correlation parameter based on a first target channel audio signal in the first multi-channel audio signal and a second target channel audio signal in a second multi-channel audio signal of the previous frame.

6. The method of claim 5, further comprising further determining the correlation parameter based on a first frequency domain parameter of the first target channel audio signal and a second frequency domain parameter of the second target channel audio signal, wherein the first frequency domain parameter is at least one of a first frequency domain amplitude value of the first target channel audio signal or a first frequency domain coefficient of the first target channel audio signal, and wherein the second frequency domain parameter is at least one of a second frequency domain amplitude value of the second target channel audio signal or a second frequency domain coefficient of the second target channel audio signal.

7. The method of claim 4, further comprising determining the correlation parameter based on a first pitch period of the current frame and a second pitch period of the previous frame.

8. The method of claim 2, further comprising further determining the third multi-channel parameter using fourth multi-channel parameters of previous T frames of the current frame when the characteristic parameter meets a second preset condition, wherein T is an integer greater than or equal to 1.

9. The method of claim 8, wherein determining the third multi-channel parameter further comprises:

determining the fourth multi-channel parameters as the third multi-channel parameter when T is equal to 1; or determining the third multi-channel parameter based on a change trend of the fourth multi-channel parameters when T is greater than or equal to 2.

10. The method of claim 8, wherein the characteristic parameter comprises at least one of a correlation parameter or a peak-to-average ratio parameter of the current frame, wherein the peak-to-average ratio parameter represents a peak-to-average ratio of a signal of at least one channel in the first multi-channel audio signal, and wherein the second preset condition is that the characteristic parameter is greater than a preset threshold.

11. An encoder, comprising:

a memory comprising instructions; and a processor coupled to the memory and configured to execute the instructions to cause the encoder to:

obtain a first multi-channel audio signal of a current frame originating from a microphone;

determine a first multi-channel parameter of the current frame, wherein the first multi-channel parameter comprises an initial inter-channel time difference (ITD) value of the current frame in a hybrid-domain and is based on the following formula:

$$ITD = \text{argmax}\left(IDFT\left(\frac{L_i(f)R_i^*(f)}{|L_i(f)R_i^*(f)|}\right)\right),$$

wherein ITD is the ITD value, wherein $L_i(f)$ represents a first frequency domain coefficient of a left-channel frequency-domain signal of the first multi-channel audio signal, wherein $R^*_i(f)$ represents a conjugate of a second frequency domain coefficient of a right-channel frequency-domain signal of the first multi-channel audio signal, wherein argmax( ) is a maximum value from a plurality of values, and wherein IDFT( ) represents an inverse discrete Fourier transform operation;

determine a first difference parameter based on first differences between the first multi-channel parameter and second multi-channel parameters of previous K frames of the current frame, wherein K is an integer greater than or equal to 1;

determine a third multi-channel parameter of the current frame based on the first difference parameter and a characteristic parameter of the current frame; and encode, based on the third multi-channel parameter, the first multi-channel audio signal into a bitstream.

12. The encoder of claim 11, wherein the processor is further configured to execute the instructions to cause the encoder to further determine the third multi-channel parameter when the first difference parameter meets a first preset condition.

13. The encoder of claim 12, wherein the first difference parameter is an absolute value of a second difference between the first multi-channel parameter and a fourth multi-channel parameter of a previous frame of the previous K frames, wherein the first preset condition is that the first difference parameter is greater than a preset first threshold or a product of the first multi-channel parameter and the fourth multi-channel parameter, and wherein the first preset condition is that the first difference parameter is less than or equal to 0.

14. The encoder of claim 12, wherein the processor is further configured to execute the instructions to cause the encoder to further determine the third multi-channel parameter using a correlation parameter of the current frame, and wherein the correlation parameter represents a degree of correlation between the current frame and a previous frame of the previous K frames.

15. The encoder of claim 14, wherein the processor is further configured to execute the instructions to cause the encoder to determine the correlation parameter based on a first target channel audio signal in the first multi-channel audio signal and a second target channel audio signal in a second multi-channel audio signal of the previous frame.

16. The encoder of claim 15, wherein the processor is further configured to execute the instructions to cause the encoder to further determine the correlation parameter based on a first frequency domain parameter of the first target channel audio signal and a second frequency domain parameter of the second target channel audio signal, wherein the first frequency domain parameter is at least one of a first frequency domain amplitude value of the first target channel audio signal or a first frequency domain coefficient of the first target channel audio signal, and wherein the second frequency domain parameter is at least one of a second frequency domain amplitude value of the second target channel audio signal or a second frequency domain coefficient of the second target channel audio signal.

17. The encoder of claim 14, wherein the processor is further configured to execute the instructions to cause the encoder to determine the correlation parameter based on a first pitch period of the current frame and a second pitch period of the previous frame.

18. The encoder of claim 12, wherein the processor is further configured to execute the instructions to cause the encoder to determine the third multi-channel parameter using fourth multi-channel parameters of previous T frames of the current frame when the characteristic parameter meets a second preset condition, and wherein T is an integer greater than or equal to 1.

19. The encoder of claim 18, wherein the processor is further configured to execute the instructions to cause the encoder to:

determine the fourth multi-channel parameters as the third multi-channel parameter when T is equal to 1; or determine the third multi-channel parameter based on a change trend of the fourth multi-channel parameters when T is greater than or equal to 2.

20. The encoder of claim 18, wherein the characteristic parameter comprises at least one of a correlation parameter or a peak-to-average ratio parameter of the current frame, wherein the peak-to-average ratio parameter represents a peak-to-average ratio of a signal of at least one channel in the first multi-channel audio signal, and wherein the second preset condition is that the characteristic parameter is greater than a preset threshold.

21. A computer program product comprising instructions that are stored on a non-transitory computer-readable medium and that, when executed by a processor, causes an encoder to:

obtain a first multi-channel audio signal of a current frame originating from a microphone;

determine a first multi-channel parameter of the current frame, wherein the first multi-channel parameter comprises an initial inter-channel time difference (ITD) value of the current frame in a hybrid-domain and is based on the following formula:

$$ITD = \text{argmax}\left(IDFT\left(\frac{L_i(f)R_i^*(f)}{|L_i(f)R_i^*(f)|}\right)\right),$$

wherein ITD is the ITD value, wherein $L_i(f)$ represents a first frequency domain coefficient of a left-channel frequency-domain signal of the first multi-channel audio signal, wherein $R^*_i(f)$ represents a conjugate of a second frequency domain coefficient of a right-channel frequency-domain signal of the first multi-channel audio signal, wherein argmax( ) is a maximum value from a plurality of values, and wherein IDFT( ) represents an inverse discrete Fourier transform operation;

determine a first difference parameter based on first differences between the first multi-channel parameter and second multi-channel parameters of previous K frames of the current frame, wherein K is an integer greater than or equal to 1;

determine a third multi-channel parameter of the current frame based on the first difference parameter and a characteristic parameter of the current frame; and encode, based on the third multi-channel parameter, the first multi-channel audio signal into a bitstream.

* * * * *